(12) United States Patent
Walker

(10) Patent No.: US 10,462,442 B2
(45) Date of Patent: Oct. 29, 2019

(54) APPARATUS, SYSTEMS AND METHODS FOR MONITORING VEHICULAR ACTIVITY

(71) Applicant: Brett I. Walker, Island Lake, IL (US)

(72) Inventor: Brett I. Walker, Island Lake, IL (US)

(*) Notice: Subject to any disclaimer, the term of this patent is extended or adjusted under 35 U.S.C. 154(b) by 0 days.

(21) Appl. No.: 13/853,346

(22) Filed: Mar. 29, 2013

(65) Prior Publication Data

US 2014/0178031 A1 Jun. 26, 2014

Related U.S. Application Data

(60) Provisional application No. 61/740,258, filed on Dec. 20, 2012.

(51) Int. Cl.
| | |
|---|---|
| *H04N 9/79* | (2006.01) |
| *H04N 7/18* | (2006.01) |
| *H04N 5/232* | (2006.01) |
| *B60R 1/00* | (2006.01) |
| *G08G 1/16* | (2006.01) |
| *G08G 1/00* | (2006.01) |
| *B60R 25/102* | (2013.01) |

(52) U.S. Cl.
CPC ............... *H04N 9/79* (2013.01); *B60R 1/00* (2013.01); *B60R 1/007* (2013.01); *B60R 25/102* (2013.01); *G08G 1/00* (2013.01); *G08G 1/16* (2013.01); *G08G 1/20* (2013.01); *H04N 5/23238* (2013.01); *H04N 7/181* (2013.01); *B60R 2300/102* (2013.01)

(58) Field of Classification Search
CPC ........ H04N 7/181; H04N 7/183; H04N 7/185; G01C 11/00; G08G 1/16; G08G 1/20; G08B 13/196

USPC .................................................. 348/143–155
See application file for complete search history.

(56) References Cited

U.S. PATENT DOCUMENTS

| | | | |
|---|---|---|---|
| 5,680,123 A | 10/1997 | Lee | |
| 5,815,093 A | 9/1998 | Kikinis | |
| 6,246,933 B1 | 6/2001 | Bague | |
| 6,333,759 B1 | 12/2001 | Mazzilli | |
| 6,449,540 B1 | 9/2002 | Rayner | |
| 6,542,077 B2 | 4/2003 | Joao | |
| 6,630,884 B1 | 10/2003 | Shanmugham | |
| 6,795,111 B1 | 9/2004 | Mazzilli | |
| 7,145,519 B2 * | 12/2006 | Takahashi et al. ............... | 345/7 |

(Continued)

FOREIGN PATENT DOCUMENTS

| | | | | |
|---|---|---|---|---|
| JP | 07-312738 A | 11/1995 | | |
| WO | WO 2004036895 A2 * | 4/2004 | ............. | H04N 7/173 |

OTHER PUBLICATIONS

International Search Report and Written Opionion; PCT/US2013/076685, dated Apr. 17, 2014.

*Primary Examiner* — Gelek W Topgyal
(74) *Attorney, Agent, or Firm* — Scherrer Patent & Trademark Law, P.C.; Stephen T. Scherrer; Monique A. Morneault

(57) ABSTRACT

Apparatuses, systems and methods monitor vehicular activity. Specifically, the apparatus, systems and methods of the present invention provide a plurality of sensors and devices for monitoring a vehicle while the vehicle is in use, including but not limited to, impact sensors, cameras, recording devices, and other like devices. The devices create data streams that are processed and/or recorded for reference to the same upon inquiry, such as after a vehicle accident or for any other purpose.

23 Claims, 21 Drawing Sheets

IMPACT/SHOCK SENSORS

- IMPACT/SHOCK SENSORS WOULD BE CONNECTED TO SYSTEM TO START RECORDING STANDARD EVENT (ACCIDENT)
- SENSOR PLACEMENT/AMOUNT SHOWN ARE FOR POTENTIAL AREAS
- SENSORS CAN BE POTENTIAL INTEGRATED WITH CARS SENSORS (IE AIRBAGS, ETC)

(56) References Cited

U.S. PATENT DOCUMENTS

| | | |
|---|---|---|
| 7,180,407 B1 | 2/2007 | Guo et al. |
| 7,486,801 B2* | 2/2009 | Suzuki et al. ............... 382/103 |
| 7,679,497 B1* | 3/2010 | Arant ...................... H04N 5/76 340/435 |
| 7,728,879 B2* | 6/2010 | Ishii ........................... 348/222.1 |
| 7,804,426 B2* | 9/2010 | Etcheson ..................... 340/937 |
| 7,983,811 B2 | 7/2011 | Basir et al. |
| 8,108,147 B1* | 1/2012 | Blackburn .................... 701/301 |
| 8,139,820 B2 | 3/2012 | Plante et al. |
| 8,175,806 B2 | 8/2012 | Toshiba |
| 2002/0063637 A1* | 5/2002 | Eida ....................... G08G 1/205 340/901 |
| 2002/0115423 A1* | 8/2002 | Hatae ............... G08B 13/19645 455/404.1 |
| 2003/0154009 A1* | 8/2003 | Basir ................... G07C 5/0891 701/32.2 |
| 2004/0085447 A1* | 5/2004 | Katta et al. .................. 348/143 |
| 2004/0113763 A1 | 6/2004 | Bendavid |
| 2005/0030379 A1* | 2/2005 | Luskin ...................... B60R 1/00 348/148 |
| 2005/0083404 A1* | 4/2005 | Pierce et al. ................. 348/148 |
| 2005/0243171 A1* | 11/2005 | Ross et al. ................... 348/148 |
| 2006/0030986 A1* | 2/2006 | Peng ...................... G07C 5/085 701/33.4 |
| 2007/0067079 A1* | 3/2007 | Kosugi .................. G07C 5/085 701/32.4 |
| 2007/0088488 A1 | 4/2007 | Reeves |
| 2007/0135979 A1* | 6/2007 | Plante .................... G07C 5/008 701/33.4 |
| 2007/0219685 A1* | 9/2007 | Plante .................... G06F 9/4443 701/33.4 |
| 2008/0137908 A1* | 6/2008 | Stein et al. ................... 382/103 |
| 2008/0281485 A1* | 11/2008 | Plante ...................... H04N 5/76 701/33.4 |
| 2008/0316312 A1* | 12/2008 | Castillo et al. ............... 348/148 |
| 2009/0273673 A1 | 5/2009 | Worley |
| 2009/0157255 A1 | 6/2009 | Plante |
| 2010/0194596 A1* | 8/2010 | Wang et al. .................. 340/936 |
| 2010/0219944 A1* | 9/2010 | McCormick ......... G07C 5/0866 340/436 |
| 2010/0225738 A1* | 9/2010 | Webster .................. B60R 11/04 348/36 |
| 2010/0253781 A1* | 10/2010 | Sasson ............... B64D 45/0015 348/148 |
| 2011/0060496 A1 | 3/2011 | Nielsen et al. |
| 2011/0234749 A1* | 9/2011 | Alon ................... G07C 5/0866 348/36 |
| 2011/0317015 A1 | 12/2011 | Seto et al. |
| 2013/0083196 A1* | 4/2013 | Zheng .................... G07C 5/0891 348/148 |
| 2013/0135472 A1* | 5/2013 | Wu et al. ..................... 348/148 |
| 2013/0314537 A1* | 11/2013 | Haler .................... G01S 5/0009 348/148 |
| 2016/0068105 A1* | 3/2016 | Plante .................... G07C 5/008 348/148 |

* cited by examiner

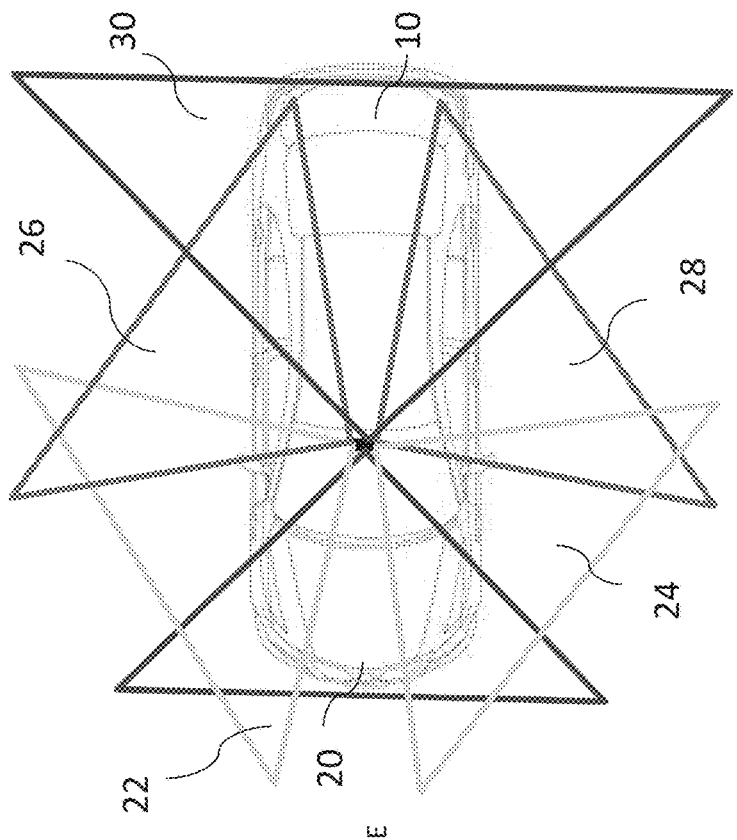

FIG. 2

GENERAL CAMERA OVERVIEW

- 6 CAMERAS OVERLAPPING FIELDS OF VIEW
- NIGHT VISION FOR NIGHT DRIVING
- AUTO IRIS – TOO MUCH/LITTLE LIGHT
- VIBRATION/SHAKE STABILIZATION
- REAL TIME RECORDING TO HARD DRIVE AND UP LOAD TO DATA CENTER WIRELESSLY
- SOFTWARE FEATURE TO DETERMINE TRAFFIC INDICATORS SUCH AS TRAFFIC SIGNS/LIGHTS, CONSTRUCTION, OTHER VEHICLES,
- ACCIDENT/EVENT ALERT LOCKS IN INFORMATION

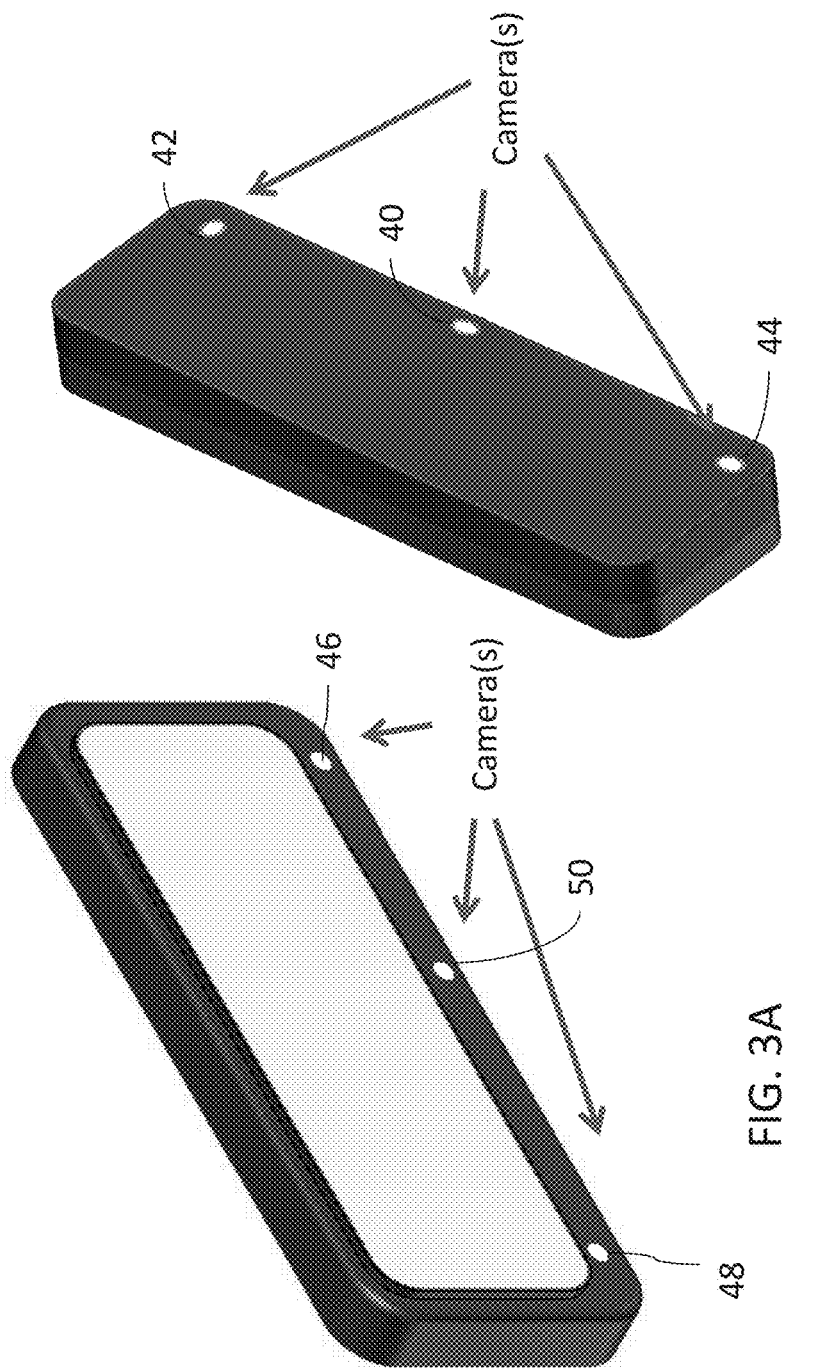

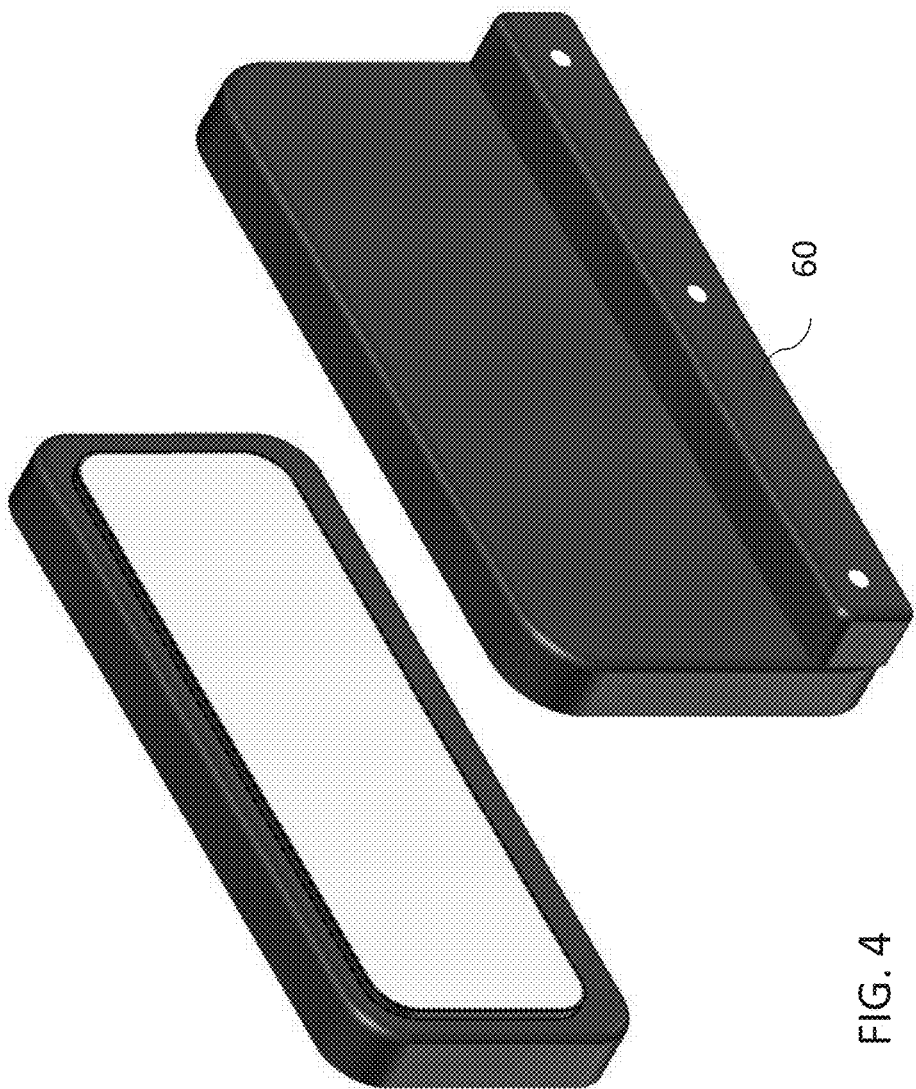

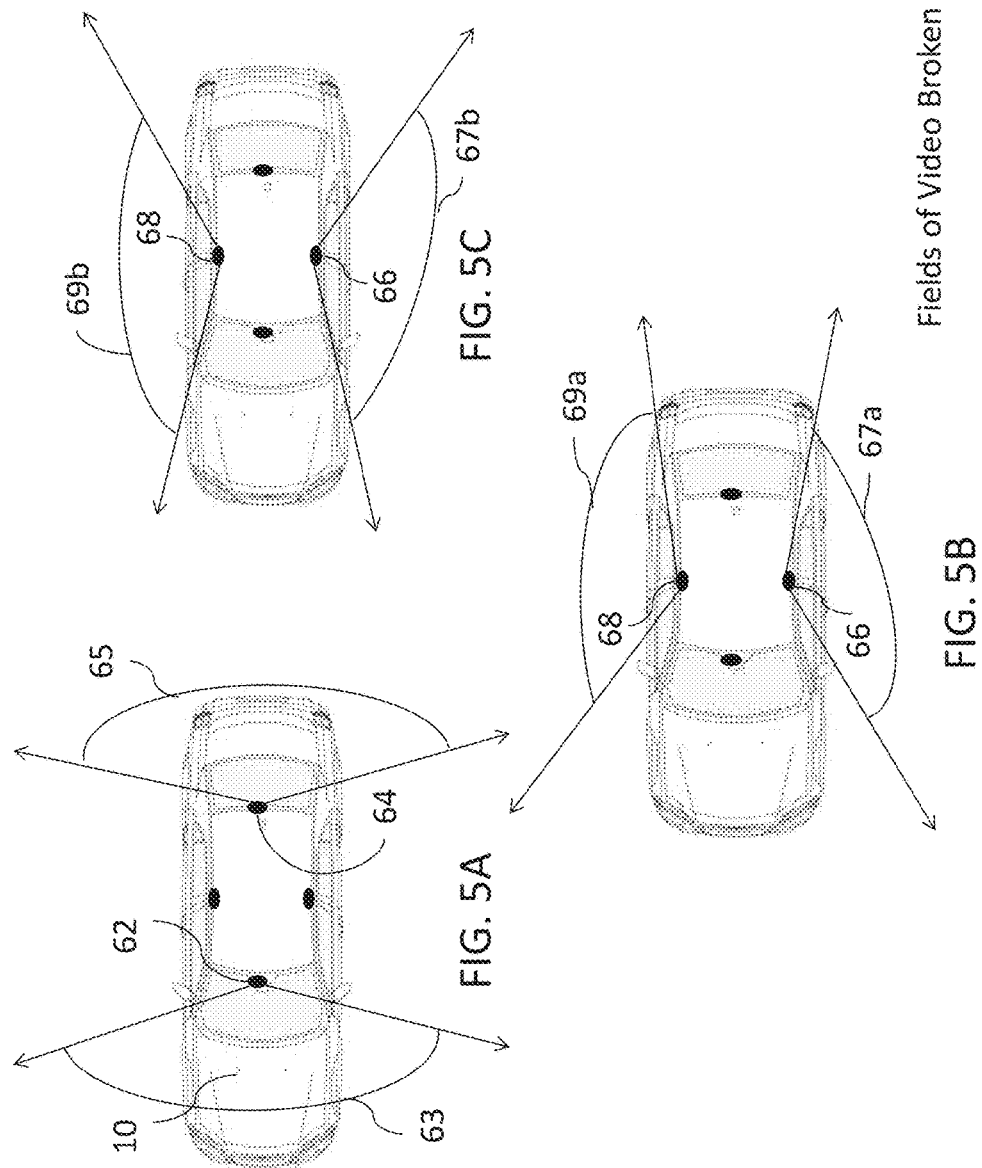

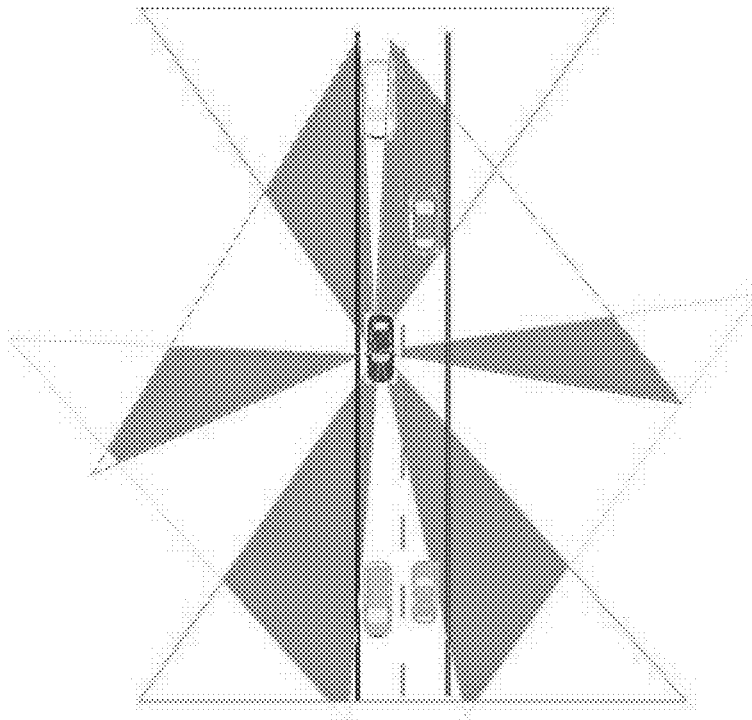
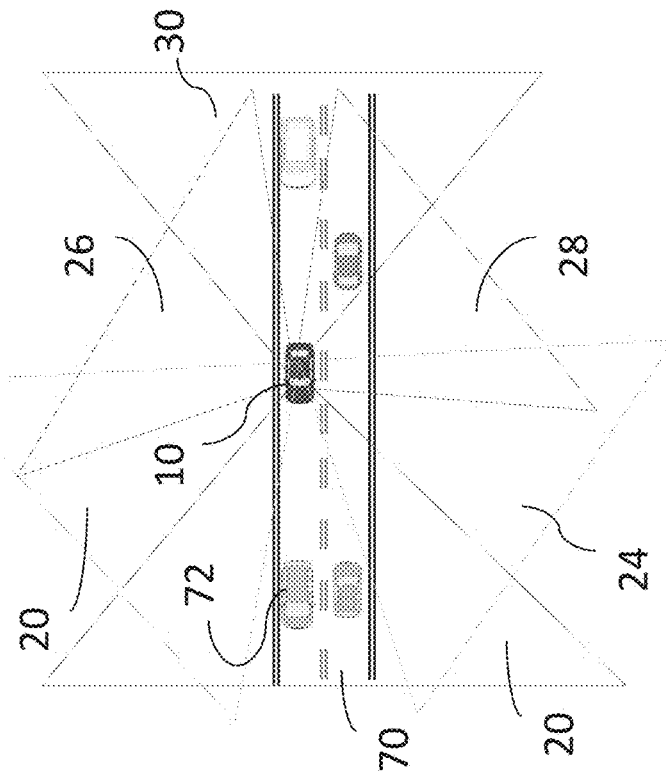
FIG. 7B
FIG. 7A
-Camera Angle would have a wide range of view from 60-170 degrees.
-Pending on Cameras over lapping fields of view could vary. Illustration is for generic purposes only.

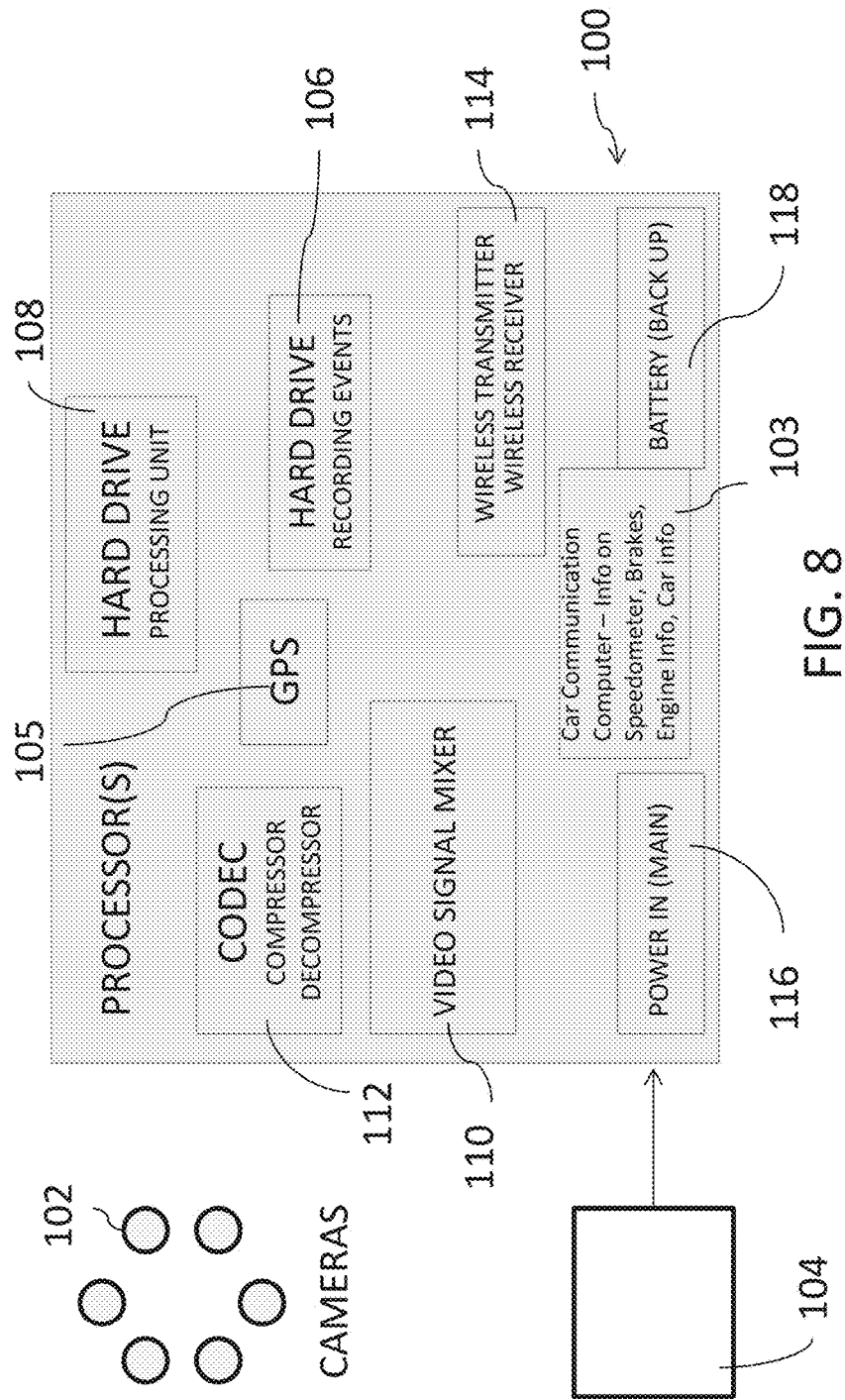

Enhanced Video OVERVIEW LAYOUT OF SYSTEM

APPARATUS, SYSTEMS AND METHODS FOR MONITORING VEHICULAR ACTIVITY

The present invention claims priority to U.S. Provisional Pat. App. No. 61/740,258, entitled "Apparatus, Systems and Methods for Monitoring Vehicular Activity", filed Dec. 20, 2012, which is incorporated herein by reference in its entirety.

TECHNICAL FIELD

The present invention relates to apparatus, systems and methods for monitoring vehicular activity. Specifically, the apparatus, systems and methods of the present invention provide a plurality of sensors and devices for monitoring a vehicle while the vehicle is in use, including but not limited to, impact sensors, cameras, recording devices, and other like devices. The devices create data streams that are processed and/or recorded for reference to the same upon inquiry, such as after a vehicle accident or for any other purpose.

BACKGROUND

Automobiles and other vehicles are highly prevalent in the modern era, with many people in the United States, and the world, owning not just one but a plurality of automobiles. They are used for many reasons, such as transportation of goods and people from one location to another, for sport, for cruising, and for many other purposes. Indeed, it is estimated that there are almost 260 million registered vehicles in the United States, with many of these vehicles on the road at any given time.

With the sheer numbers of vehicles in operation in the United States, and the world for that matter, automobile accidents can be quite common. Indeed, in 2009 it is estimate that there were about 10.8 million automobile accidents in the United States alone, with many, unfortunately, resulting in fatalities and many, many more resulting in injuries and almost all resulting in automobile damage. The cost of damage to body and automobile is simply staggering.

Witnesses are oftentimes necessary to determine what happened during an automobile accident. In many cases, a driver may be focused on something else, such as the road in front of him or her, and may have little to no knowledge of what is happening around his or her car. Witnesses can often provide clues and testimony to establish what happened during an automobile accident, and how to apportion blame relating to the same.

However, in many cases, there simply are no witnesses to aid in the determination of accident causation. Many times, a driver may be involved in a single automobile accident, meaning that he or she may have struck an impediment, or been struck by an object or another vehicle, and may, as explained above, have no knowledge of how it happened. Moreover, drivers may be involved accidents involving two or more vehicles, where the drivers may either have no recollection or knowledge of how it happened, or may have different recollections of what happened during the accident. Further, witnesses, whether drivers or other individuals that may witness an accident, may have faulty recollections or may have reason to lie to investigators regarding an accident.

For example, a very large issue with respect to automobile accidents involves so-called "hit and run" accidents, where an automobile may be struck by another vehicle and the other vehicle may leave the scene, never to be heard from again. In many cases, the driver has no knowledge of what happened during the accident, especially if struck from behind or from the side, due to being focused on the road ahead. In other cases, the driver may be injured or worse, and the driver may have no ability to communicate specific information about the accident to investigators. In cases such as these, the driver of the other vehicle may get away with causing the accident, and may escape the blame and the cost that normally would have been attributed to them.

The ability to apportion blame in an automobile accident is important due to the staggering costs of automobile usage in this country and around the world. Automobiles are expensive and can be very dangerous to individuals. Oftentimes, experts hired by insurance companies are brought in to review automobile accidents to ensure that the proper party bears the brunt of blame, whether that party is the insured or someone else. However, it may be difficult, after the accident has already happened, to piece together the true details about the accident.

Of course, there may be other circumstances that one would wish to know more about the usage of a vehicle, such as in situations where an accident almost happened, but was avoided, during a burglary or vandalism of the automobile, or for any other reason.

A need, therefore, exists for apparatus, systems and methods for monitoring a vehicle during usage thereof. More specifically, a need exists for apparatus, systems and methods for monitoring a vehicle to determine specific facts about the vehicle usage at a particular time.

Moreover, a need exists for apparatus, systems and methods for monitoring a vehicle during a traumatic event, such as an accident, a burglary, vandalism, or other like event, to determine specific facts about the event. In addition, a need exists for apparatus, systems and methods for monitoring a vehicle during circumstances where a user merely wishes to know specific information about the vehicle and the external surroundings of the vehicle at a particular time.

In addition, a need exists for apparatus, systems and methods for monitoring a vehicle to record data and information useful for reconstructing or otherwise determining the cause of an accident. More specifically, a need exists for apparatus, systems and methods for monitoring a vehicle to record data and information useful to apportion blame and damages to those who should be held responsible for the accident.

Further, a need exists for apparatus, systems and methods for monitoring a vehicle allowing a user to receive data relating to a particular event or series of events during vehicular usage. Still further, a need exists for apparatus, systems and methods for monitoring a vehicle to allow for apportionment of blame in a traumatic event, such as an accident, a burglary, vandalism or the like.

SUMMARY OF THE INVENTION

The present invention relates to apparatus, systems and methods for monitoring vehicular activity. Specifically, the apparatus, systems and methods of the present invention provide a plurality of sensors and devices for monitoring a vehicle while the vehicle is in use, including but not limited to, impact sensors, cameras, recording devices, and other like devices. The devices create data streams that are processed and/or recorded for reference to the same upon inquiry, such as after a vehicle accident or for any other purpose.

To this end, in an embodiment of the present invention, a system for monitoring and recording data relating to usage of a vehicle is provided. The system comprises at least one camera for recording visual data relating to vehicle usage around the vehicle during vehicle usage, the at least one camera recording visual information relating to a period of time, wherein, during a predetermined event, the recorded visual data relating to a shortened period of time immediately prior to the event, during the event, and immediately after the event, is permanently stored for analysis of the same. In an embodiment, the recorded data is uploaded.

In an embodiment, at least one sensor is provided for gathering data relating to vehicle usage, the data gathered by the sensor stored along with the visual information from the at least one camera.

In an embodiment, the visual information is analyzed by a processor to identify objects external to the vehicle. The objects may be selected from the group consisting of vehicle signage, roadway markers, other vehicles, and impediments.

In an embodiment, the visual information and the data gathered by the at least one sensor is uploaded to another system. In an embodiment, the system is a data center.

It is, therefore, an advantage and objective of the present invention to provide apparatuses, systems and methods for monitoring a vehicle during usage thereof.

More specifically, it is an advantage and objective of the present invention to provide apparatuses, systems and methods for monitoring a vehicle to determine specific facts about the vehicle usage at a particular time.

Moreover, it is an advantage and objective of the present invention to provide apparatuses, systems and methods for monitoring a vehicle during a traumatic event, such as an accident, a burglary, vandalism, or other like event, to determine specific facts about the event.

In addition, it is an advantage and objective of the present invention to provide apparatuses, systems and methods for monitoring a vehicle during circumstances where a user merely wishes to know specific information about the vehicle and the external surroundings of the vehicle at a particular time.

In addition, it is an advantage and objective of the present invention to provide apparatuses, systems and methods for monitoring a vehicle to record data and information useful for reconstructing or otherwise determining the cause of an accident.

More specifically, it is an advantage and objective of the present invention to provide apparatuses, systems and methods for monitoring a vehicle to record data and information useful to apportion blame and damages to those who should be held responsible for the accident.

Further, it is an advantage and objective of the present invention to provide apparatuses, systems and methods for monitoring a vehicle allowing a user to receive data relating to a particular event or series of events during vehicular usage.

Still further, it is an advantage and objective of the present invention to provide apparatuses, systems and methods for monitoring a vehicle to allow for apportionment of blame in a traumatic event, such as an accident, a burglary, vandalism or the like.

Additional features and advantages of the present invention are described in, and will be apparent from, the detailed description of the presently preferred embodiments and from the drawings.

BRIEF DESCRIPTION OF THE DRAWINGS

The drawing figures depict one or more implementations in accord with the present concepts, by way of example only, not by way of limitations. In the figures, like reference numerals refer to the same or similar elements.

FIG. 2 illustrates a top view of vehicles with a plurality of fields of view from cameras mounted therein in an embodiment of the present invention.

FIGS. 3A and 3B illustrate embodiment of cameras mounted in a rear view mirror in an embodiment of the present invention.

FIG. 4 illustrates a camera module mounted to a rear view mirror in an embodiment of the present invention.

FIGS. 5A-5C illustrate a top view of a vehicle having a plurality of cameras mounted therein or thereon and representative fields of view for the cameras in an embodiment of the present invention.

FIGS. 7A and 7B illustrate overlapping fields of view for mounted cameras within a vehicle in an embodiment of the present invention.

FIG. 8 illustrates a schematic of a system overview in an embodiment of the present invention.

DETAILED DESCRIPTION OF THE PRESENTLY PREFERRED EMBODIMENTS

Figure 1:
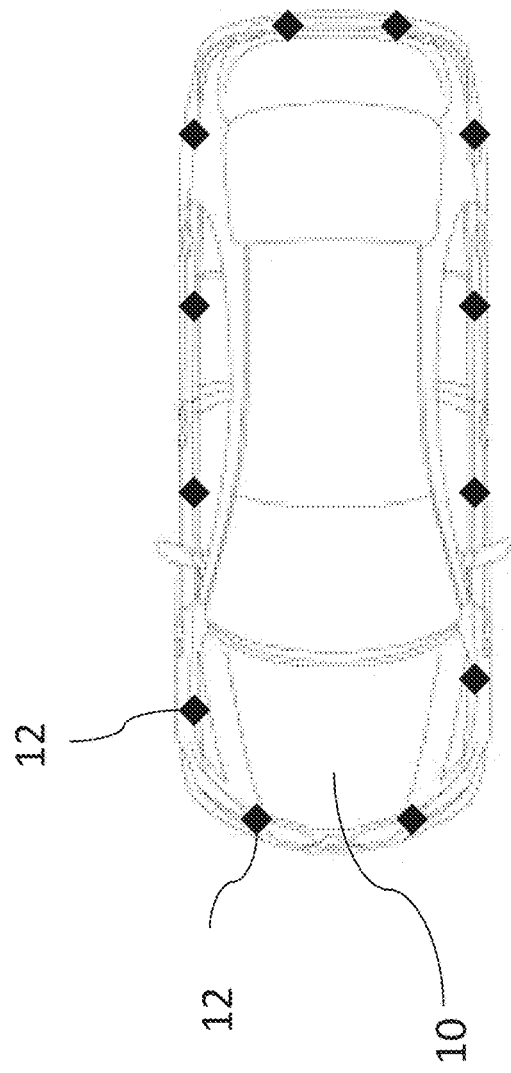
FIG. 1 illustrates a top view of a vehicle having a plurality of sensors thereon in an embodiment of the present invention.

The present invention relates to apparatus, systems and methods for monitoring vehicular activity. Specifically, the apparatus, systems and methods of the present invention provide a plurality of sensors and devices for monitoring a vehicle while the vehicle is in use, including but not limited to, impact sensors, cameras, recording devices, and other like devices. The devices create data streams that are processed and/or recorded for reference to the same upon inquiry, such as after a vehicle accident or for any other purpose.

The present invention relates to apparatus, systems and methods that provide an account of an event or a plurality of events using real time data recorded during usage of a vehicle. Specifically, the apparatus, systems and methods include real-time recording of a driver's surroundings, such as a driver's front, front sides, rear sides including blind spots, and rear of the driver's vehicle. Specifically, data may be gathered and recorded using one or a plurality of cameras and/or sensors, such as impact sensors, weather sensors, and other like sensors, placed in strategic locations around a vehicle.

It should be noted that the apparatuses, systems and methods described herein are generally described for a generic "vehicle". A vehicle, for purposes of this invention, may be any transport that may be utilized for people or cargo. Preferably, the vehicle may be an automobile. However, the vehicle may also include trucks, such as trucks, such as semis, tractor trailers, boats, or any other form of mobile transport apparent to one of ordinary skill in the art.

Data gathered by the cameras and/or sensors can be recorded and processed to provide an analysis of a driver's situation prior to, during, and after an event, such as an accident or the like. Specifically, data relating to vehicles' speed, distance to other vehicles or impediments, weather, lane usage, signage, and other like information, can be gathered, recorded and/or analyzed pursuant to the present invention.

More specifically, real-time data gathering, recording and analysis of traffic indicators, such as traffic lights, speed limits, traffic signage, and other like traffic indicators may be done via the apparatus, systems and methods of the present invention.

Data gathered by the cameras and/or sensors may be recorded both to a local hard drive in the vehicle and to a data center, such as a wireless data center that may act as a repository for all data. Data contained on the hard drive and/or at the data center may be processed and/or analyzed to help provide specific information relating to a particular event or a series of events during the usage of the vehicle.

An event may be an accident, such as a collision with another vehicle, a collision with an impediment, such as a structure, or a collision with a person. The present invention may gather information prior to, during and immediately after the event to provide information relating to the vehicular usage during the event, and the actions of others around the vehicle, such as other automobiles and the like. In another embodiment, an event may be triggered not because of specific data relating to the specific vehicle, but may be triggered by an alert that may be received by the present invention, such as an alert received by local authorities relating to, without limitation, a terrorist attack, a natural disaster, an extreme crime, or any other event so deemed.

In another embodiment, data gathered by the present invention may be utilized to provide real-time warnings to drivers. For example, indicators on the vehicles dashboard may tell a driver about certain conditions to be aware of. Moreover, signals may be transmitted to the driver via other means, such as vibrating steering wheels, which may indicate to a driver of a condition or warning of which the driver should be made aware, based on logic provided in the processing and analysis capabilities of the present invention.

The data gathered, recorded, stored, processed and/or analyzed may further provide specific information relating to the driving habits of the driver, such as hard-braking, swerving, speeding, and additional information that may be utilized by others to help gauge the driving abilities of the driver.

Now referring to the figures, wherein like numerals refer to like parts, FIG. 1 illustrates a vehicle 10 that may have a plurality of sensors 12 in and around the vehicle for sensing specific conditions relating to the usage of the vehicle 10. Specifically, the sensors 12 may be, without limitation, impact or shock sensors that may be utilized to record where a shock or an impact may occur to the vehicle 10. The data generated by the sensors 12 may be recorded and stored on a hard drive contained within the vehicle, and may be submitted wirelessly to a data center, as described in more detail below.

Other sensors may be incorporated into the vehicle 10, such as sensors relating to specific usage or conditions of the vehicle. For example, use of airbags may be sensed and recorded. In addition, many automobiles have computers integrated therein to provide proper usage of the vehicle, or to sense when maintenance is required, such as oil levels, other fluid levels and the like. The present invention may be interconnected with a vehicle's onboard computer to retrieve, record and store specific information gathered by the vehicle's onboard computer.

As describe above, a plurality of cameras may be mounted within the vehicle for gathering visual data around the vehicle during usage thereof. Specifically, as illustrated in FIG. 2, six onboard cameras may provide six overlapping fields of view 20, 24, 26, 28 and 30 in an area of at least 360 degrees around the vehicle. Preferably, the onboard cameras may provide a total field of view that is greater than 360 degrees around the vehicle due to the overlapping fields of view. Thus, the present invention ensures that all relevant visual data is recorded fully around the vehicle. Specifically, a camera may show a front field of view 20. Two front-side cameras may show front-side fields of view 22, 24. Two rear-side cameras may show rear-side fields of view 26, 28. And one rear camera may show a rear field of view 30. Although FIG. 2 illustrates six cameras, it should be noted that any number of cameras may be utilized as apparent to one of ordinary skill in the art.

As illustrated, the fields of view for the cameras mounted in and around the vehicle may have overlapping fields of view, which may be advantageous to provide additional information that may not necessarily be apparent or achievable with cameras that have non-overlapping fields of view. For example, because the overlapping fields of view may be from cameras that are offset or otherwise mounted in different locations on the vehicle, a first camera having an overlapping field of view with a second camera may show additional information within that overlapping field of view compared to the second camera, due to its field of view generated from a different angle. Thus, overlapping fields of views derived from cameras mounted in different locations may show a recorded scene in so-called "enhanced 2D", where information that would otherwise be behind an object in the second camera's field of view may be viewable by the first camera. Thus, additional information may be derived from the overlapping fields of view. Moreover, the overlapping fields of view, due to offset cameras or otherwise by cameras mounted in different locations on a vehicle, may be combined to form stereoscopic images of scenes or events, which may be useful when trying to reconstruct an event based on the recorded information, as described herein.

The cameras may have capabilities that allow them to gather visual data at any time of day or night, and during any weather conditions or the like. Specifically, the cameras may have, for example, night vision to gather data at night or in dark locations, such as tunnels, infrared for measuring heat, and/or automatic irises for opening and/or closing based on light levels. Moreover, because the cameras are mounted on a vehicle, automatic vibration/shake stabilization may be utilized to provide clearer views of visual data.

The cameras, providing overlapping fields of view, may provide visual data of the area at least 360 degrees around the vehicle. The data gathered may be recorded to an onboard hard drive for storage thereof and/or may be uploaded wirelessly to a data center external to the vehicle. As noted below, processing capabilities, onboard and/or at the data center, may process and analyze the visual data.

In a preferred embodiment of the present invention, the present invention may be utilized to gather and store data relating to a vehicle before, during and immediately after an event, such as an accident, collision or the like. Preferably, the data gathered and stored on the hard drive may be looped to write over data recorded after a specific period of time. Therefore, hard drive space may be re-utilized until an event happens.

Once an event is detected by the present invention, such as if an accident or a collision is automatically detected, or if a user alerts the present invention that an event has occurred, the present invention may lock information relating to the event. Specifically, information from a time period prior to the event may be stored and kept. In a preferred embodiment, a very brief period of time, such as thirty seconds or one minute of data gathered prior to an event may be locked so that the same is not recorded over. Of course, data gathered during the event will be locked as well. In addition, data over a time period after an event has occurred may also be stored and locked, depending on what information is desired by a user thereof. For example, information may be recorded for a particular period of time after an event has occurred. Alternatively, the system of the present invention may simply record as much time as its memory buffer will allow.

Referring now to FIGS. 3A and 3B, six cameras 40, 42, 44, 46, 48 and 50 may be provided that generally provide the six overlapping fields of view 20, 22, 24, 26, 28 and 30, respectively. In a preferred embodiment, the six cameras 40-50 may be built into the rear-view mirror of the vehicle, which may act as a central locus for gathering the visual data around the vehicle, as described herein. The cameras may be integrally contained within the rear view mirror, as shown in FIGS. 3A, 3B, or may be attached to the rear view mirror as a separate module 60, as illustrated in FIG. 4. However, the invention should not be limited as provided, and the cameras may be mounted in any location to provide a clear, unobstructed view of the area surrounding the vehicle. For example, the cameras may be mounted outside the vehicle, inside the vehicle, on top of the vehicle, on the bottom of the vehicle, or in any other location apparent to one of ordinary skill in the art.

FIGS. 5A, 5B and 5C illustrate an automobile 10 having cameras disposed therein and/or therearound the automobile 10 to provide a full 360 degree field of vision (or more, due to overlapping fields of view) for recording events that may occur outside the automobile 10. The cameras may be mounted inside or outside the vehicle, or both inside and outside the vehicle. For example, camera 62 may be a front mounted camera having a field of vision 63 disposed forwardly of the automobile 10. Preferably, camera 62 may be an internally-mounted camera, such as a camera mounted on the rear view mirror or other location on or around the front windshield. In an alternate embodiment, camera 62 may be an externally mounted camera mounted on the hood, the grill or other forward location on an automobile.

Moreover, camera 64 may be rear mounted camera having a field of vision 65 disposed rearwardly of the automobile 10. Preferably, camera 64 may be an internally mounted camera, such as a camera mounted inside the automobile 10 on or around the rear windshield. In an alternate embodiment, camera 64 may be externally mounted on the trunk, by the rear bumper, or in any other location.

Camera 66 may be a dual camera system, comprising two cameras aimed in opposite directions to capture fields of view either forwardly on the side of the automobile 10 or rearwardly on the side of the automobile 10. Camera 68 may also be a dual camera system, comprising two cameras aimed in opposite directions to capture fields of view either forwardly on the side of the automobile 10 or rearwardly on the side of the automobile 10. Specifically, a first camera in each of cameras 66, 68 may record side rearwardly fields of vision 67a, 69a, as illustrated in FIG. 5B, while a second camera in each of cameras 66, 68 may record side forwardly fields of vision 67b, 69, as illustrated in FIG. 5C.

Figure 6A:
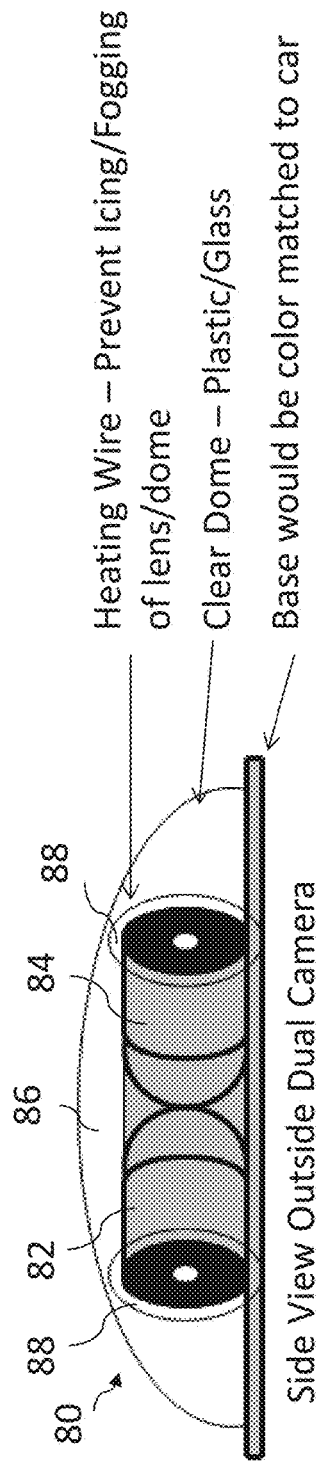
FIGS. 6A-6B illustrate exemplary cameras utilized to record events in an embodiment of the present invention.
Figure 6B:
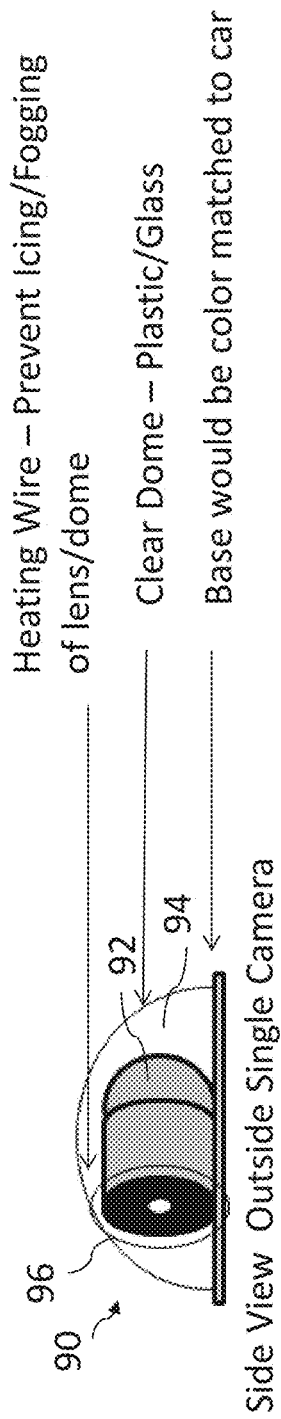

Specifically, dual cameras 66, 68 may be mounted to the exterior of the automobile in an embodiment illustrated in FIGS. 6A. 6B illustrates a single camera that may be utilized, as detailed herein. Specifically, dual camera system 80 is illustrated in FIG. 6A, having a first camera 82 and a second camera 84 mounted, generally, in divergent or opposite directions to provide a field of view of roughly 180 degrees or nearly so. Preferably, the dual camera system 80 may be externally mounted on a side of an automobile, as described above with reference to FIGS. 5A-5C. The dual camera system 80 may further comprise a transparent dome 86 for protecting the cameras therein that may be sealed to environmental conditions. Moreover, the dual camera system 80 may include a heating element 88 that may engage when snow or ice builds up that may block the views recorded by the first and second cameras. FIG. 6 B illustrates a single externally mounted camera system 90 having a single camera 92 disposed within a transparent dome 94. The single camera system 90 may also have a heating element 96 that may be utilized to melt and/or clear ice and/or snow that may block the view recorded by the single camera 92.

FIG. 7A shows an example of the use of six cameras to provide the six overlapping fields of view 20-30 while the vehicle 10 is in use on a roadway 70. Specifically, the overlapping fields of view 20-30 may be utilized to record data about the roadway conditions and/or other vehicles 72 that may be on the roadway, or any other information as described below. FIG. 7B illustrates the degree to which the fields of view 20-30 may overlap.

FIG. 8 illustrates a graphical representation of a system 100 of the present invention. The system 100 may include the cameras 102, which may be integrated into the system 100 via any manner apparent to one of ordinary skill in the art, either wired or wirelessly. Moreover, the system 100 may include other sensors, such as sensors associated with the vehicle's onboard computer that may be utilized to monitor internal vehicle components, such as the vehicle's speedometer, brake light indicator, turn signal indicators, headlights, and other common components typically monitored by the vehicle's onboard computer. In addition, the system may include the impact sensors 104, as described above, or any other sensor in and/or around the vehicle. Further a GPS device 105 may be integrated into the system 100 as well, providing geographic location information of the vehicle that may be monitored and recorded by the system 100, as described herein.

The data fed from the cameras 102, vehicle on-board computer 103, sensors 104, and/or GPS device 105, or any other device or sensor useful for monitoring the vehicle, may ultimately be recorded to a hard drive 106. Various processing units may be contained within the system, such as a hard drive processing unit 108, which may manage the data on the hard drive 106, a video signal mixer 110, which may process the visual data received from the cameras 102, a CODEC 112, which may compress and/or decompress the data for storing on the hard drive and/or for transmitting the same. As described above, information may be received by the system 100 from external sources and transmitted to external receivers via wireless transmitter/wireless receiver 114. Of course, the system 100 requires power in 116 to power the system 100, the cameras 102, the sensors 104 and any other module requiring power. A battery back-up 118 may be provided in case of main power shut down to ensure that the system continues to operate in the event of loss of main power.

Figure 9:
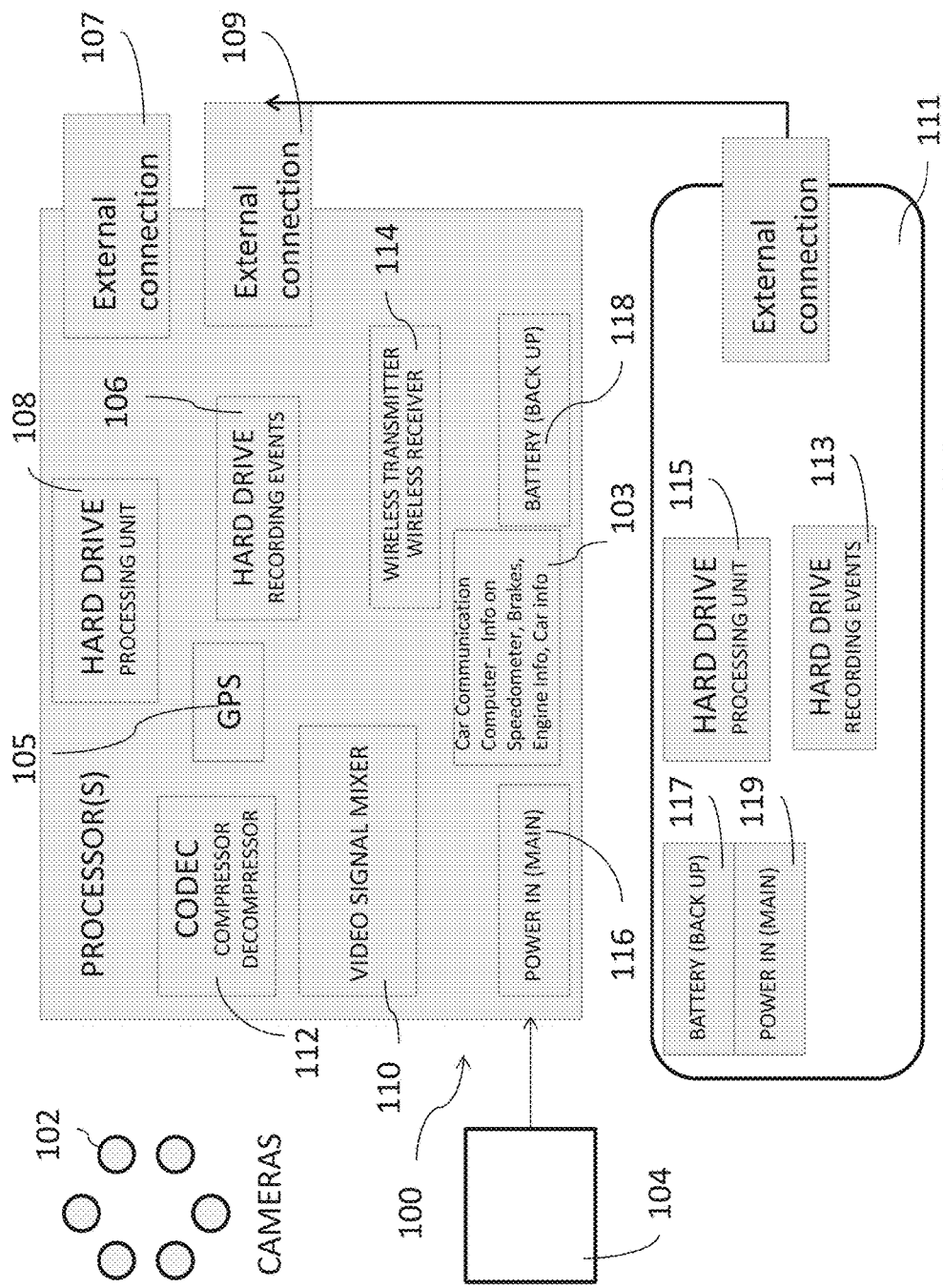
FIG. 9 illustrates a schematic of an alternate system overview in an embodiment of the present invention.

In an alternate embodiment of the present invention illustrated in FIG. 9, the system 100 may include one or a plurality of external connections 107, 109 for externally connecting an external hard drive recording system 111 into the system 100. Specifically, the external hard drive recording system 111 may be connected via a wired or wireless connection via any means apparent to one of ordinary skill in the art. The external hard drive recording system 111 may have a hard drive 113 for recording events, and a hard drive processing unit 115 for processing and analyzing events recorded by the hard drive 113. Of course, the external hard drive recording system 111 may be powered, such as via battery power 117 or via power line 119.

The external hard drive recording system 11 may be utilized to transfer recordings captured on the hard drive 106, including raw data from the cameras 102 and/or the sensors 104, and/or analysis conducted by the hard drive processing unit 108.

Figure 10:
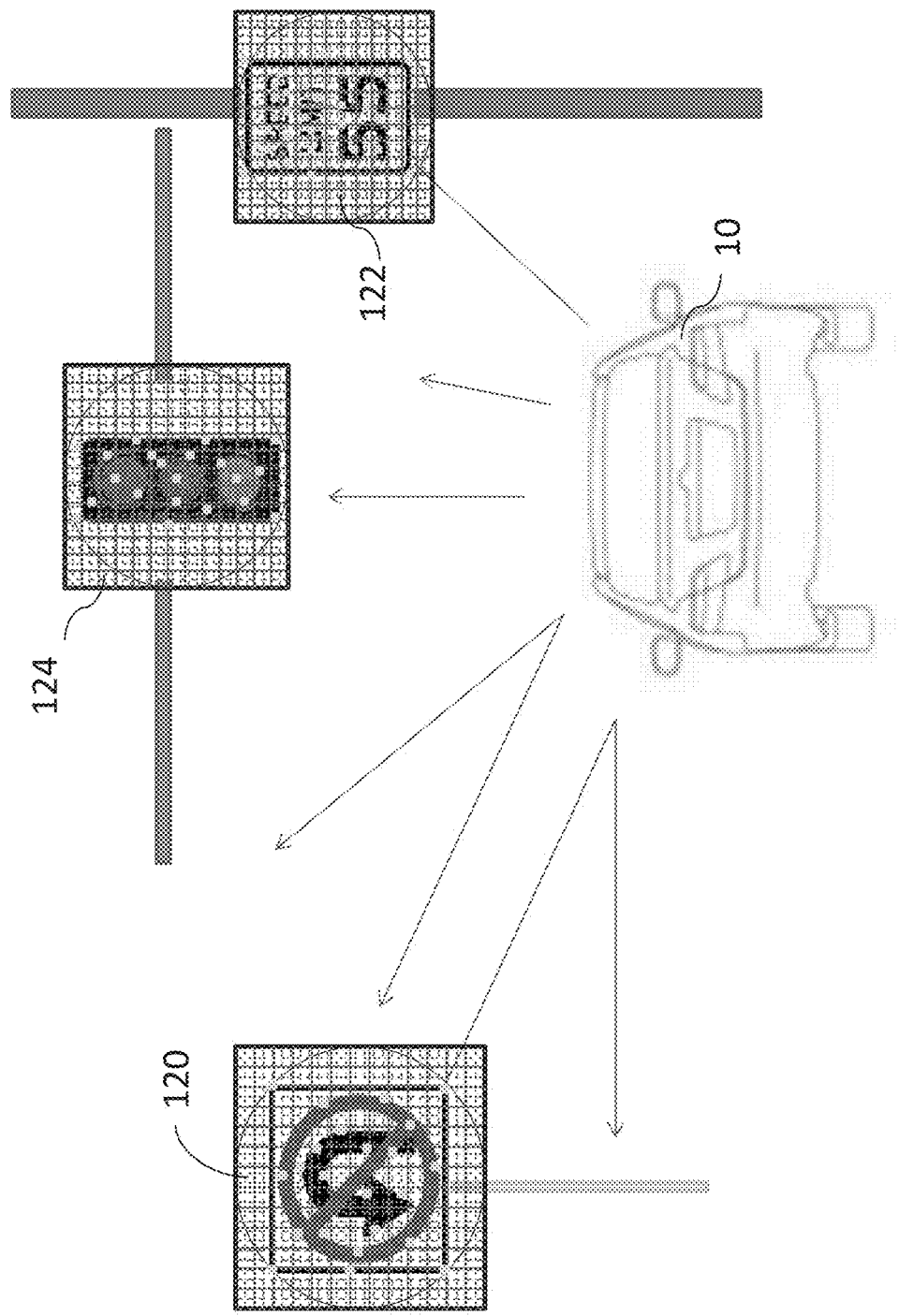
FIG. 10 illustrates a rear view of a vehicle analyzing vehicle signage and traffic indicators in an embodiment of the present invention.

In a preferred embodiment of the present invention, a vehicle 10 may utilize the cameras contained therein and the processing ability of the present invention, to identify signage, traffic signals, traffic indicators, other vehicles, or any other object that the vehicle 10 may encounter during usage thereof. As illustrated in FIG. 10, the cameras may gather visual data about the various traffic indicators that may be on the roadway, and may be able to identify the traffic indicators via identification algorithms within the system. Specifically, a "matching algorithm" may be used to determine whether a traffic sign, for example, is a significant or otherwise standard sign. The traffic sign may be matched using an algorithm that detects sign shape, image shape, wordage, colors, or any other indicator present on the sign to help analyze and identify the same. The algorithm, and processor that utilizes the algorithm, may match the traffic sign with those contained within a database. If a match is made, the present invention maintains its monitoring of the sign. If a match is not made, then the present invention ceases monitoring the sign, and continues scanning to identify the next sign or other object encountered. The identification algorithms may be utilized to identify signage, as described above, traffic indicators, other vehicles, or other objects encountered during vehicle usage.

Figure 11:
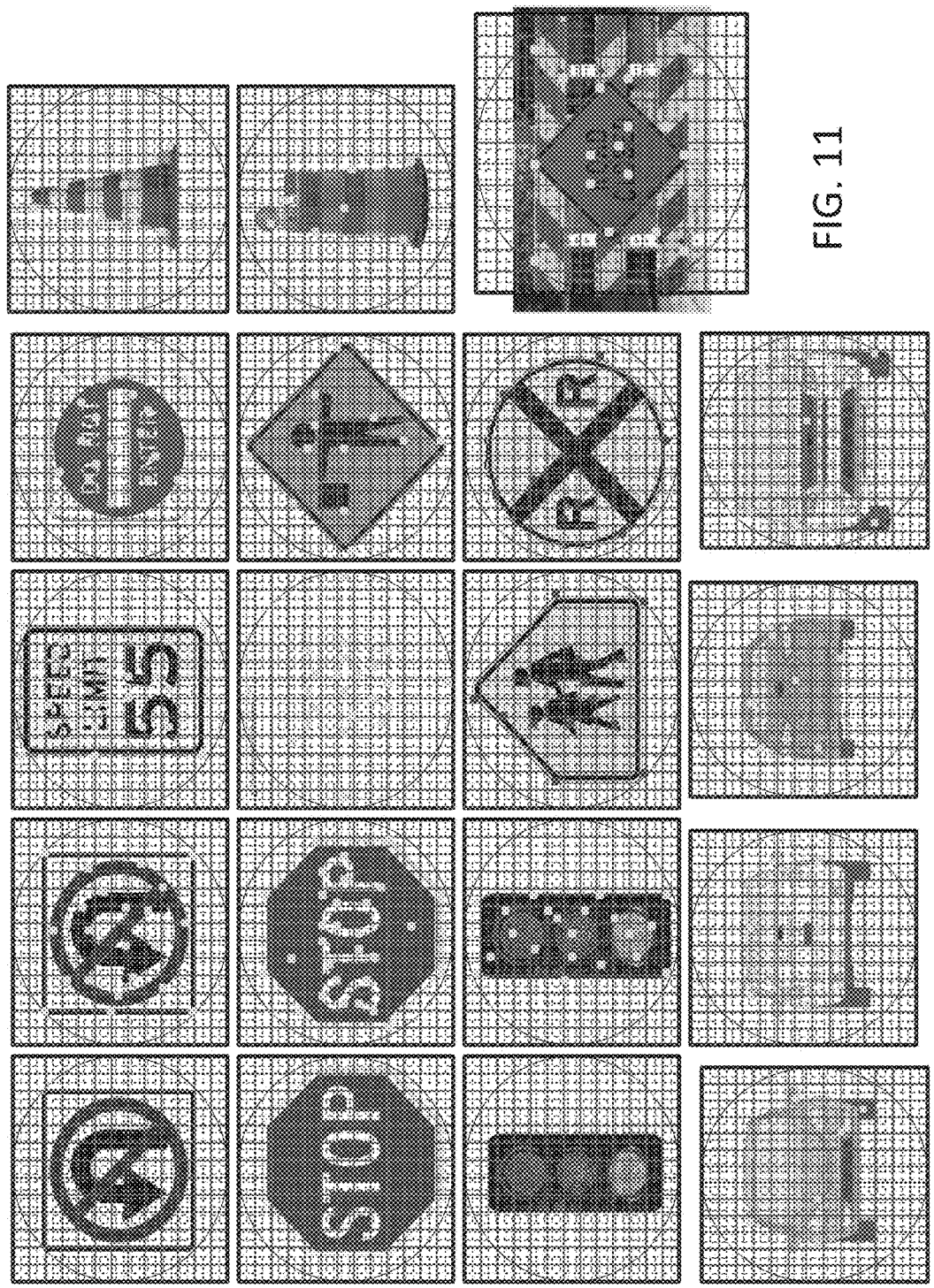
FIG. 11 illustrates examples of road signs or other traffic indicators analyzed by the apparatuses, systems and methods of the present invention.

Specifically, as illustrated in FIG. 10, examples of signage, such as a "No U-Turn" sign 120 and a "55 mph Speed Limit" 122 sign may be identified based on the analyzing and processing ability of the present invention. In addition, a traffic light signal 124 may be identified pursuant to an identifying algorithm of the present invention. Specifically, the system of the present invention may identify certain characteristics or visual cues of the signage, traffic lights, or other traffic indicators, to identify the signage or other traffic indicator. FIG. 11 illustrates a plurality of traffic signs that may be identified by the present invention based on identifying algorithms and visual cues thereof, although it should be noted that the present invention should not be limited as shown in FIG. 11. Any traffic signage may be identified using the systems of the present invention.

The traffic signage and/or other traffic indicators may be identified and used by the present invention in an analysis of vehicle usage in relation to the external traffic indicators. For example, the systems of the present invention may identify a traffic sign indicating a specific speed limit, and then may relate that data to data gathered about the vehicle's speed to determine whether the vehicle is following the requirements dictated by the signage. Either this data is merely gathered and stored, or a signal may be expressed to a driver, such as a warning light on the vehicle's dashboard, or a vibration within the steering wheel, that the driver is not following the appropriate speed limit.

The sensors and the cameras of the present invention may constantly monitor the conditions around the vehicle for recording thereof of data and/or for providing warnings or signals to the driver regarding his or her driving capabilities.

The systems of the present invention may also utilize identification algorithms to identify other vehicles and their relative motions, such as towards, away from, turning or the like.

Figure 12:
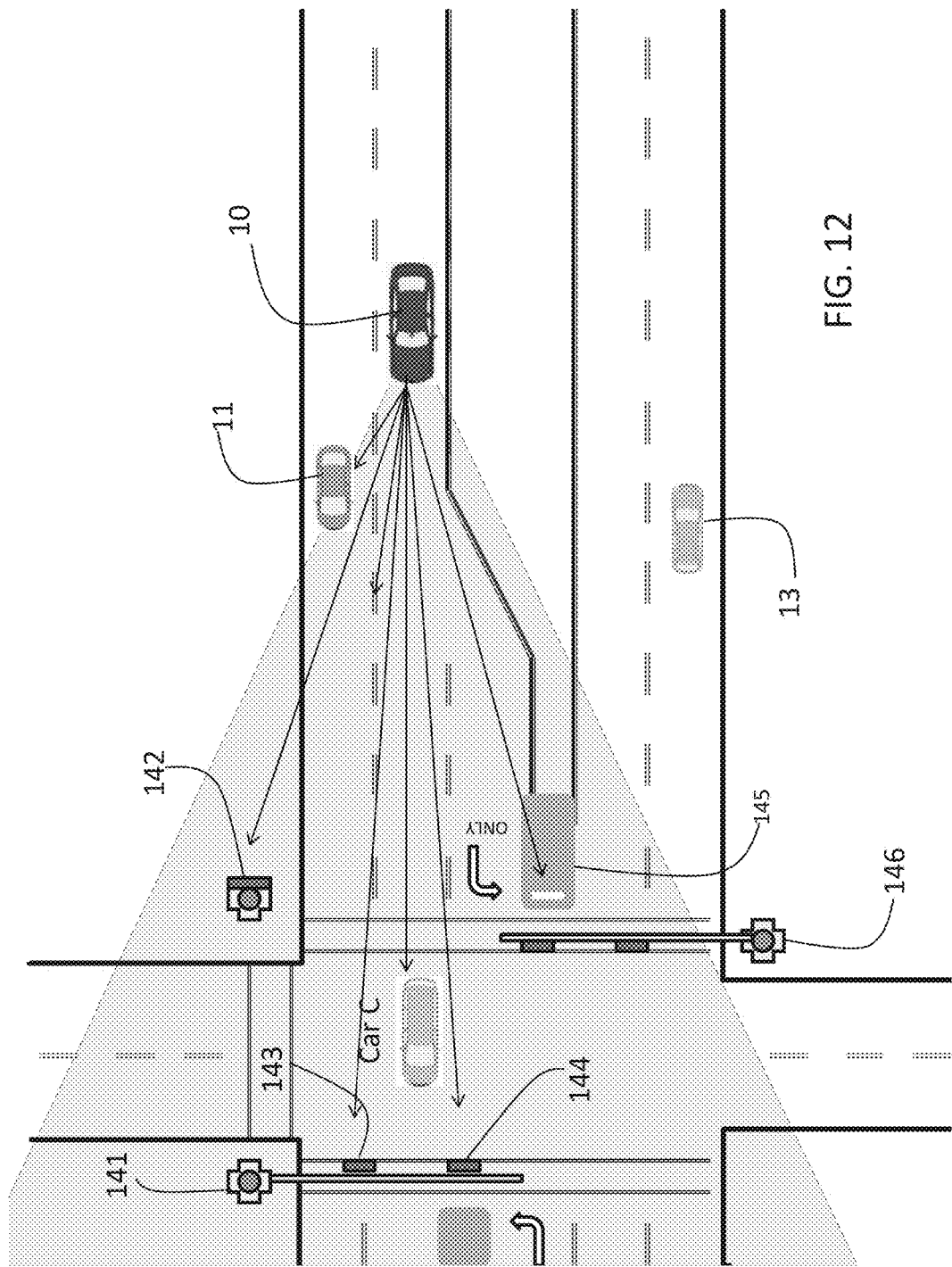
FIG. 12 illustrates a top view of an exemplary identification analysis by the apparatuses, systems and methods of the present invention.

In an example of the present invention, FIG. 12 illustrates a vehicle 10 having a front camera recording data, as described herein, relating to conditions, signage, traffic indicators and other vehicles that may be immediately in front of vehicle 10. Specifically, the cameras and systems of the present invention may identify vehicle 140, overhanging stop light 141, stop light with "not turn on red" indicator 142, overhanging stop light 143, overhanging stop light with turning arrow 144, and left turn arrow and no U-turn signs 145. Of course, any other signage, whether on the side of the roadway, above the roadway, on the roadway or the like may be identified. Moreover, any other vehicle may be identified, including their relative motions and directions.

Figure 13:
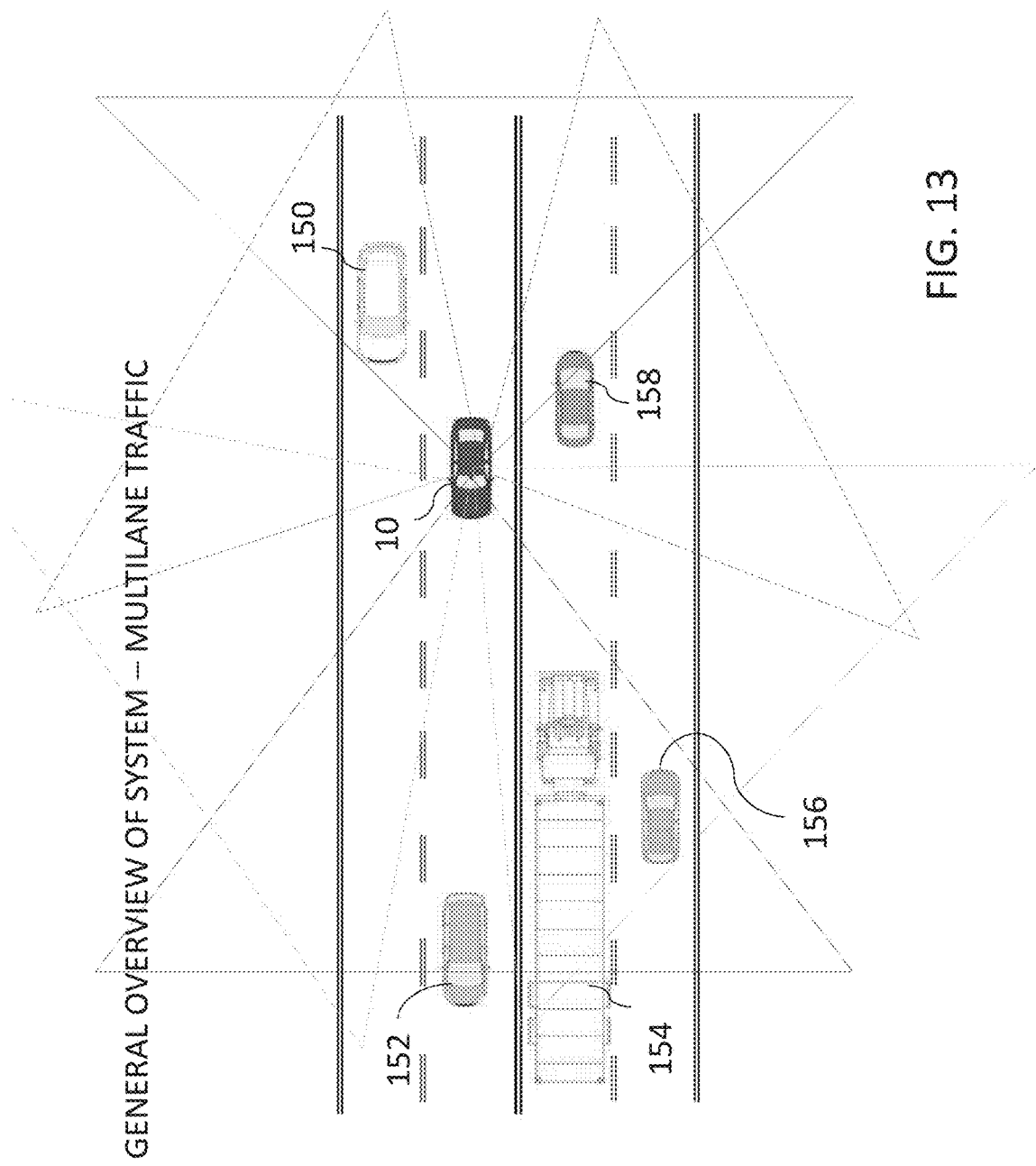
FIG. 13 illustrates a top view of a general overview of the apparatuses, systems and methods of the present invention.

In another exemplary embodiment, the vehicle 10 may utilize the cameras and overlapping fields of view to record, analyze and identify vehicles, signage, traffic indicators and the like in multilane traffic, as illustrated in FIG. 13. Thus, for example, a plurality of vehicles 150, 152, 152, 156, and 158 may identified, along with their relative motions and directions of travel.

Figure 14:
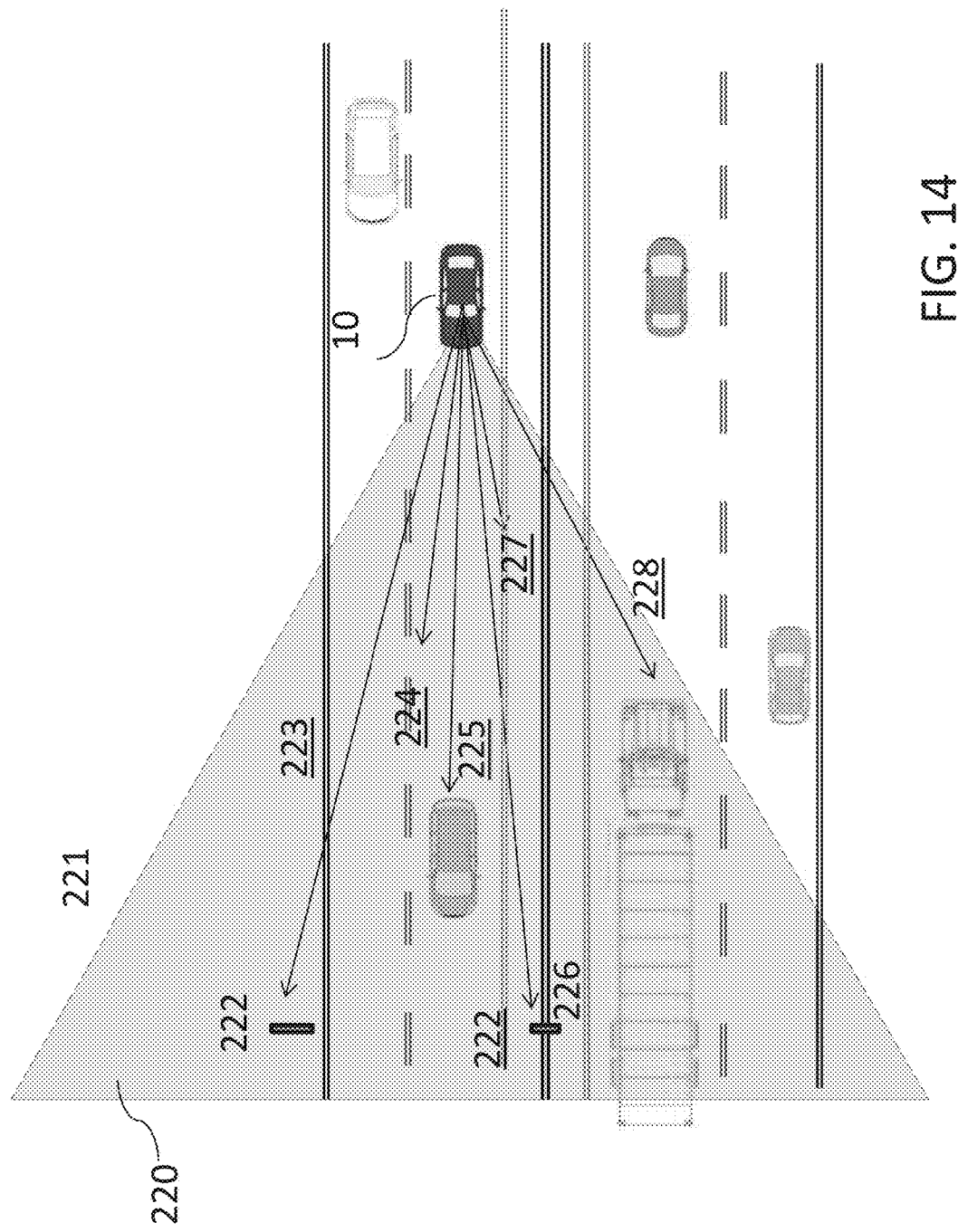
FIG. 14 illustrates a top view of an exemplary identification analysis by the apparatuses, systems and methods of the present invention.

FIG. 14 illustrates an exemplary embodiment of the present invention of a front camera with a front field of view 220 (labeled as Camera 221) in multilane traffic recording events from an automobile 10. As shown the front camera may record, and the present invention may detect and identify traffic signs 222, which may be detected by an identification algorithm and may be processed to determine whether the is contained within a database of signs.

Further, an algorithm may be utilized to detect and identify road lane lines, such as white dash lane dividers 224. An algorithm may further be used to detect vehicles 225 in front, and determines distance, speed, lane usage, and any other additional information. An algorithm further may be used to detect another sign 226 and process to determine whether it is in the database. An algorithm further may detect a road lane line, such as a white solid line 227. An algorithm may further be used to detect an oncoming vehicle 228, determining distance, speed, lane usage, and/or other additional information. This information may be stored within the hard drive and/or uploaded to a data center, as described herein.

Figure 15:
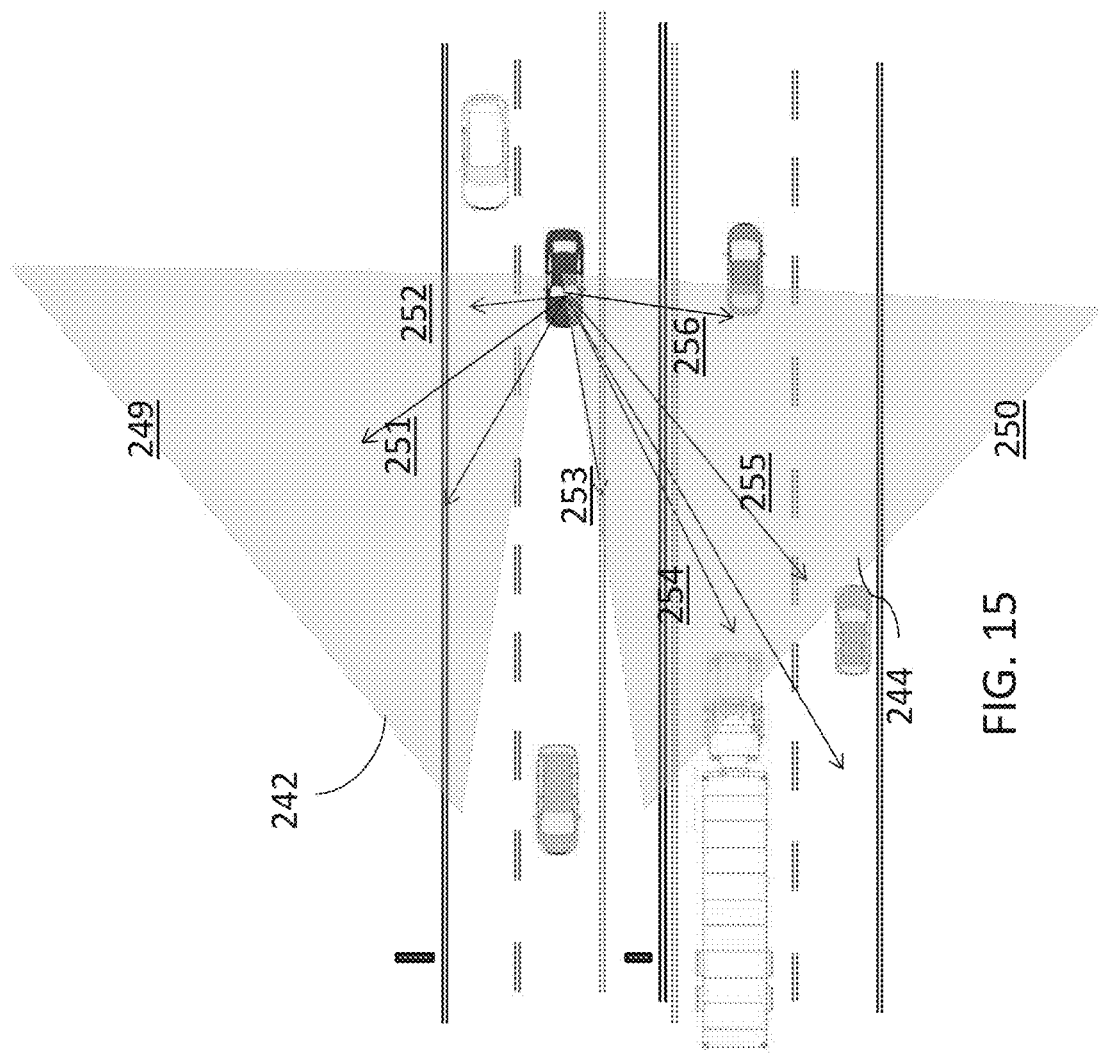
FIG. 15 illustrates a top view of an additional exemplary identification analysis by the apparatuses, systems and methods of the present invention.

FIG. 15 illustrates an exemplary embodiment of the present invention of the two front-side cameras with front-side fields of view 242, 244 (labeled 249 and 250 in FIG. 15). The present invention may detect the absence of impediments and upcoming vehicles 251 and 152. The present invention may utilize an algorithm to detect road lane lines, such as a white solid line 253, which may be the same solid white line that Camera 1 detected, which may then drop the tracking thereof and resume scanning. The present invention may utilize an algorithm to detect an oncoming vehicle 154, determining distance, speed, lane usage, and/or other additional information, which may be the same vehicle that Camera 1 detected, which may then drop the tracking thereof and resume tracking. The present invention may further utilize an algorithm to detect an oncoming vehicle 255, determining distance, speed, lane usage, and/or other additional information. The present invention may further utilize an algorithm to detect a passing vehicle 256, which may disappear from the field of view 250, which may then drop the process thereof.

Figure 16:
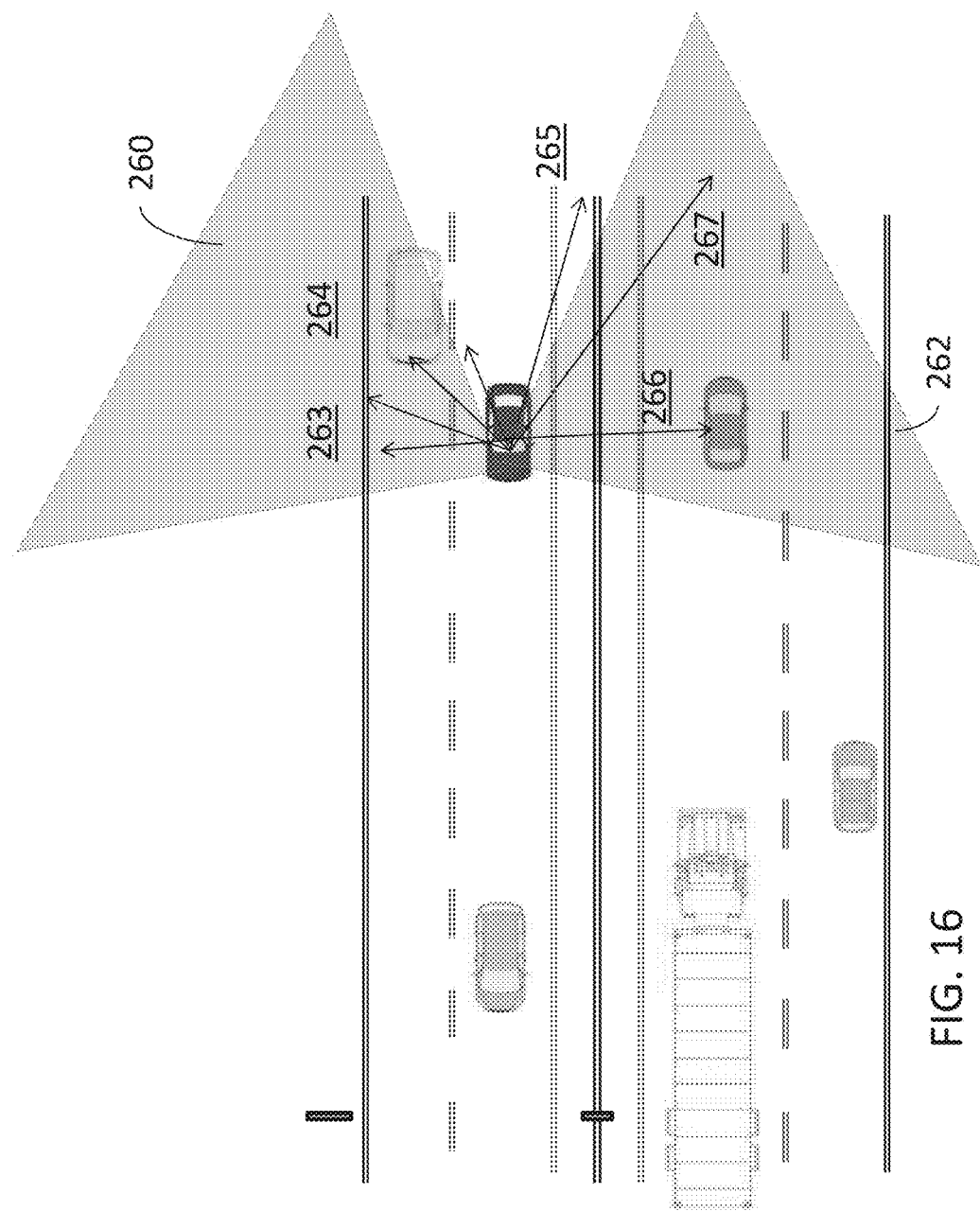
FIG. 16 illustrates a top view of an additional exemplary identification analysis by the apparatuses, systems and methods of the present invention.

FIG. 16 illustrates an exemplary embodiment of the present invention of the two read-side cameras with rear-side fields of view 260, 262. The present invention may detect the absence of impediments 263, and may further scan upcoming vehicles 264, detecting speed, distance, lane usage and/or other additional information. The present invention may further utilize an algorithm to detect a road barrier 265, such as a concrete lane divider. Moreover, the present invention may utilize an algorithm to detect an oncoming vehicle 266, determining distance, speed, lane usage, and/or other additional information. The present invention may utilize an algorithm to detect additional vehicles 267 and detecting additional traffic information.

Figure 17:
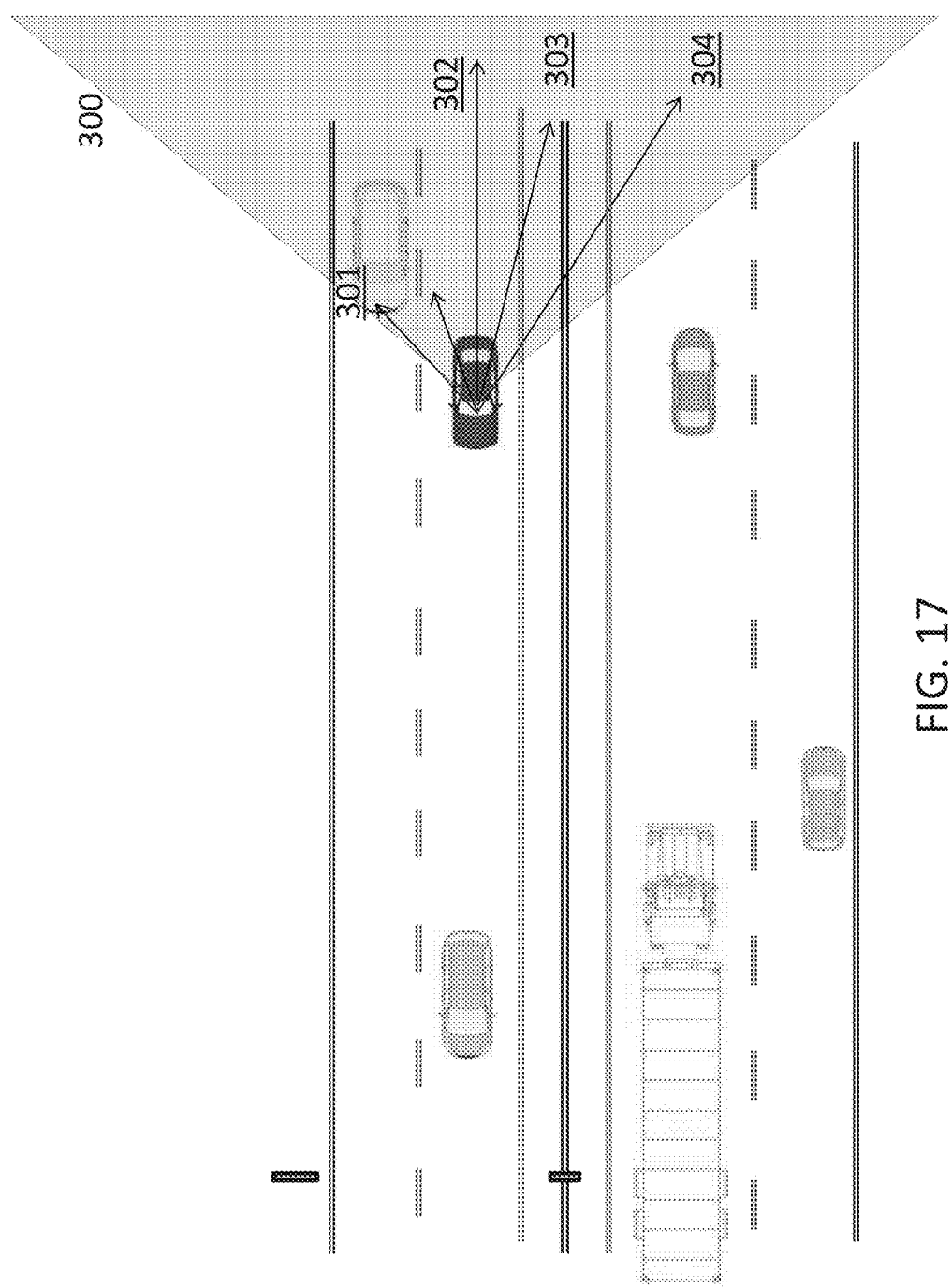
FIG. 17 illustrates a top view of a further exemplary identification analysis by the apparatuses, systems and methods of the present invention.

FIG. 17 illustrates an exemplary embodiment of the present invention of a rear field of view 300 from a rear camera. The present invention utilizes an algorithm to scan for upcoming vehicles 301 detecting distance, speed, lane usage and/or other additional information. Moreover, the present invention utilizes an algorithm to scan for further upcoming vehicles 302. The present invention utilizes an algorithm to detect a road barrier 303 such as a concrete lane divider. In addition, the present invention utilizes an algorithm to detect additional vehicles 304 and additional traffic information.

Figure 18:
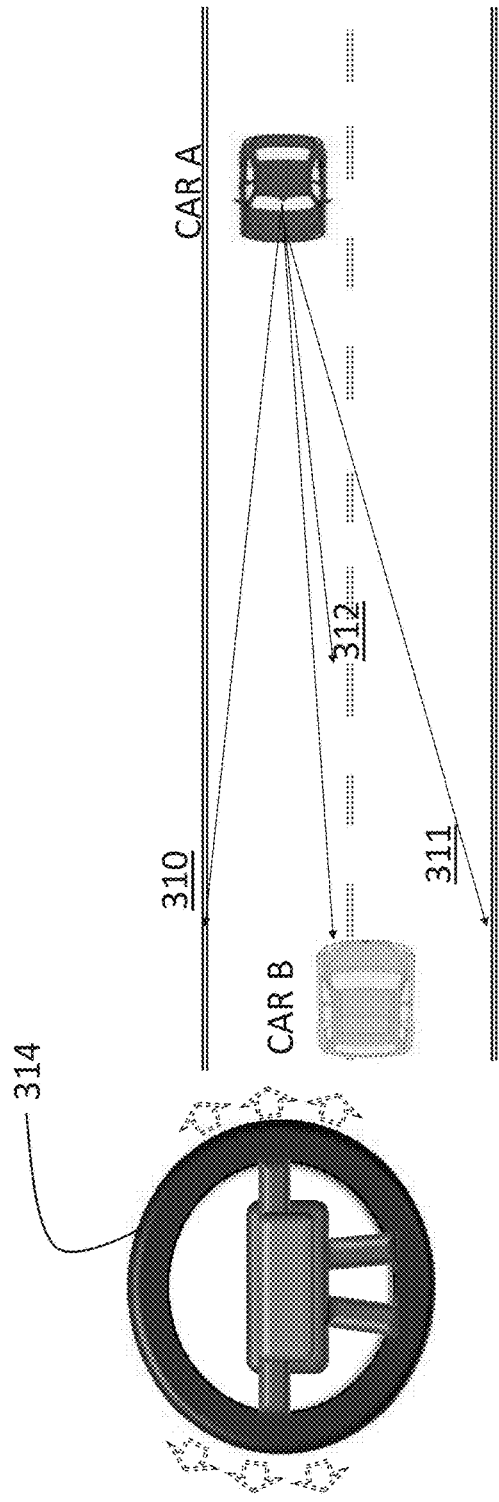
FIG. 18 illustrates a top view of a still further exemplary identification analysis by the apparatuses, systems and methods of the present invention, including means for warning a driver of a hazard.

In another exemplary embodiment of the present invention illustrated in FIG. 18, the present invention may utilize the cameras and sensors, and algorithms to specifically detect and store information concerning roadway conditions, such as a Car (B), which may detect its distance, speed, lane usage and/or other additional information. In addition, the present invention may detect road lane markers 310, 311 and 312. More importantly, however, the present invention may detect that Car B is a potential danger, because it may be driving in Car A's lane and coming towards Car A. The present invention may send a signal to vibrate the steering wheel of the driver, such as on the left hand side of the steering wheel 314, for example, thus alerting the driver to the danger on his left side. The vibration may get stronger as the danger gets closer to Car A.

Figure 19A:
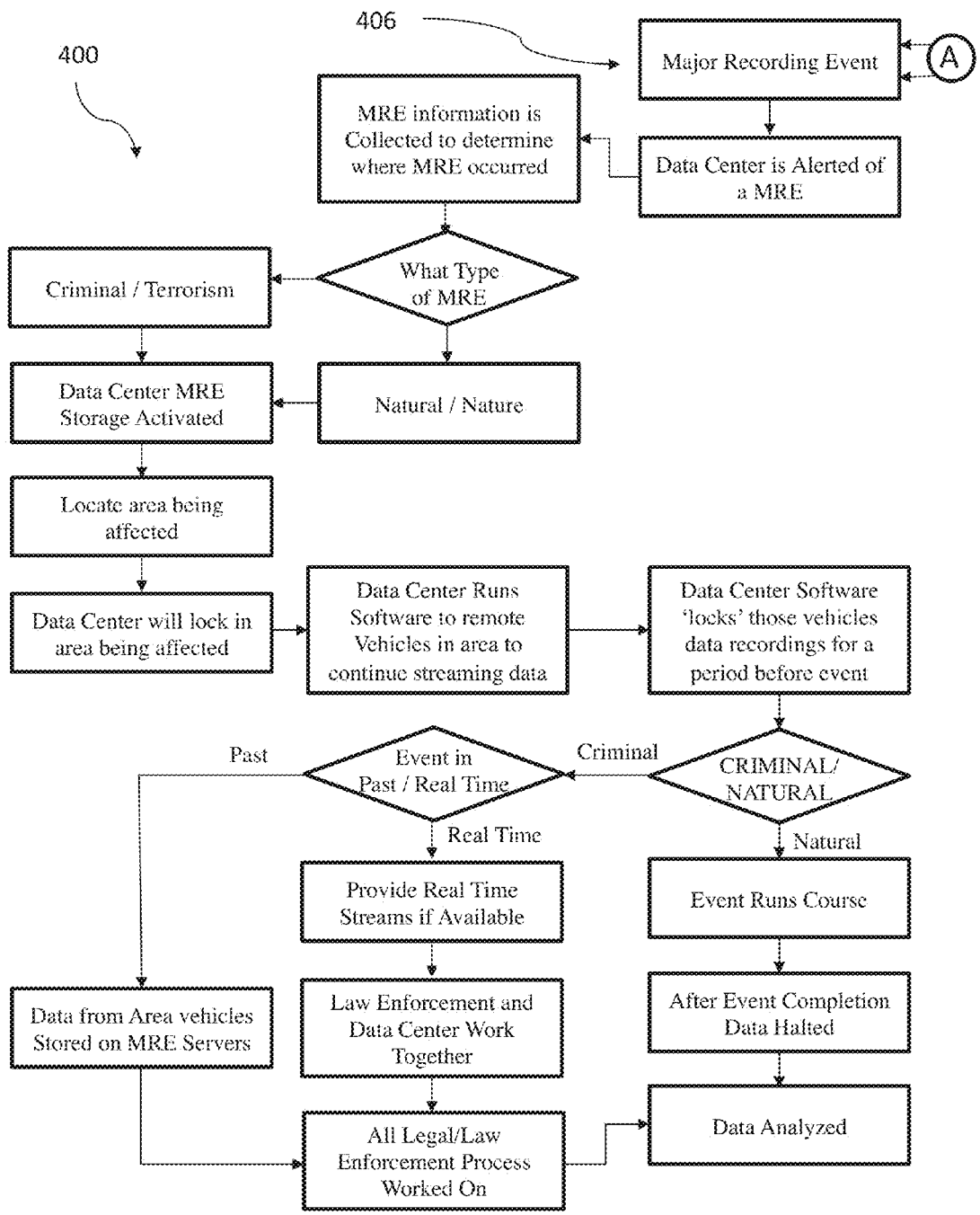
FIGS. 19A-19C illustrate an exemplary system and method of the present invention.
Figure 19B:
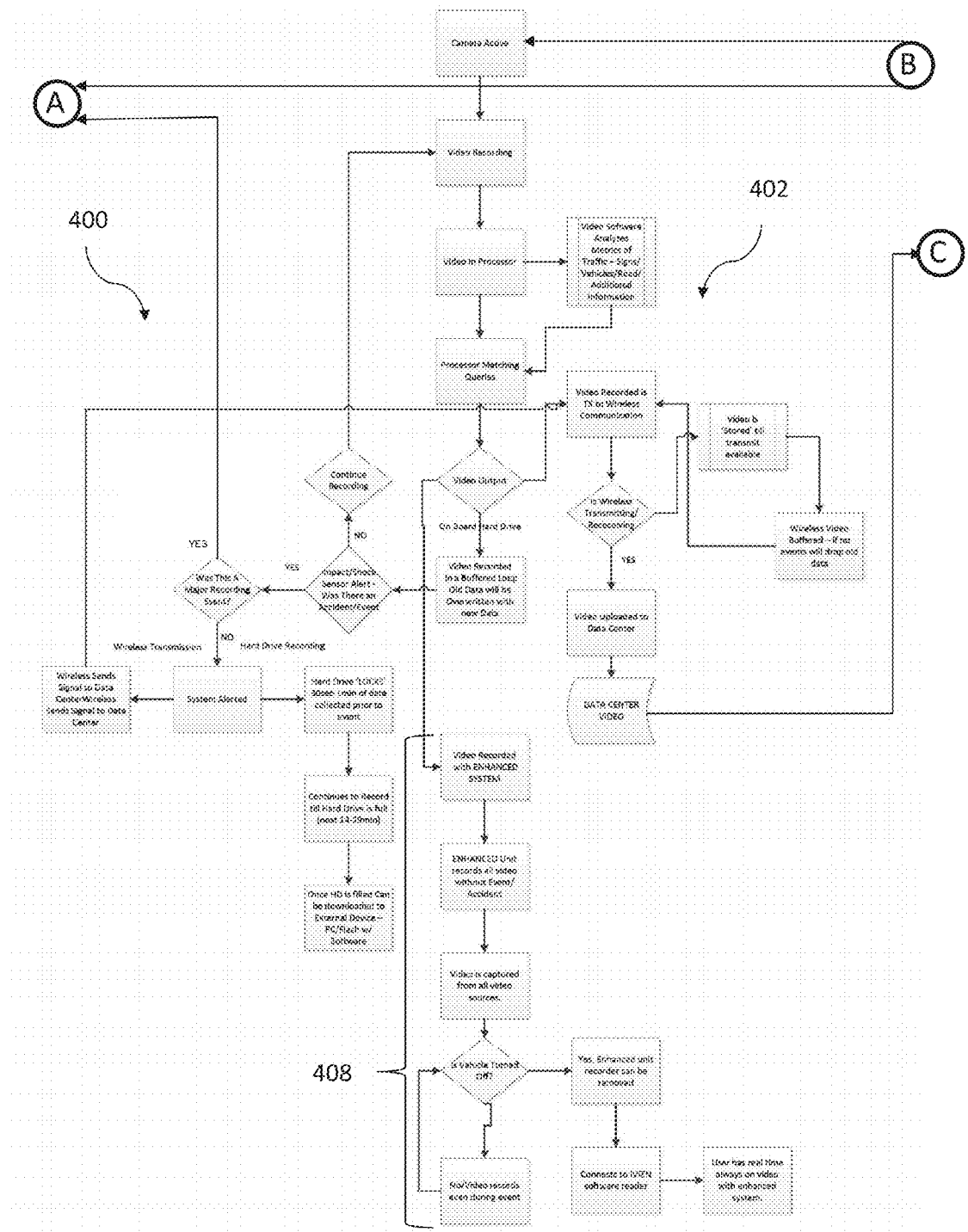
Figure 19C:
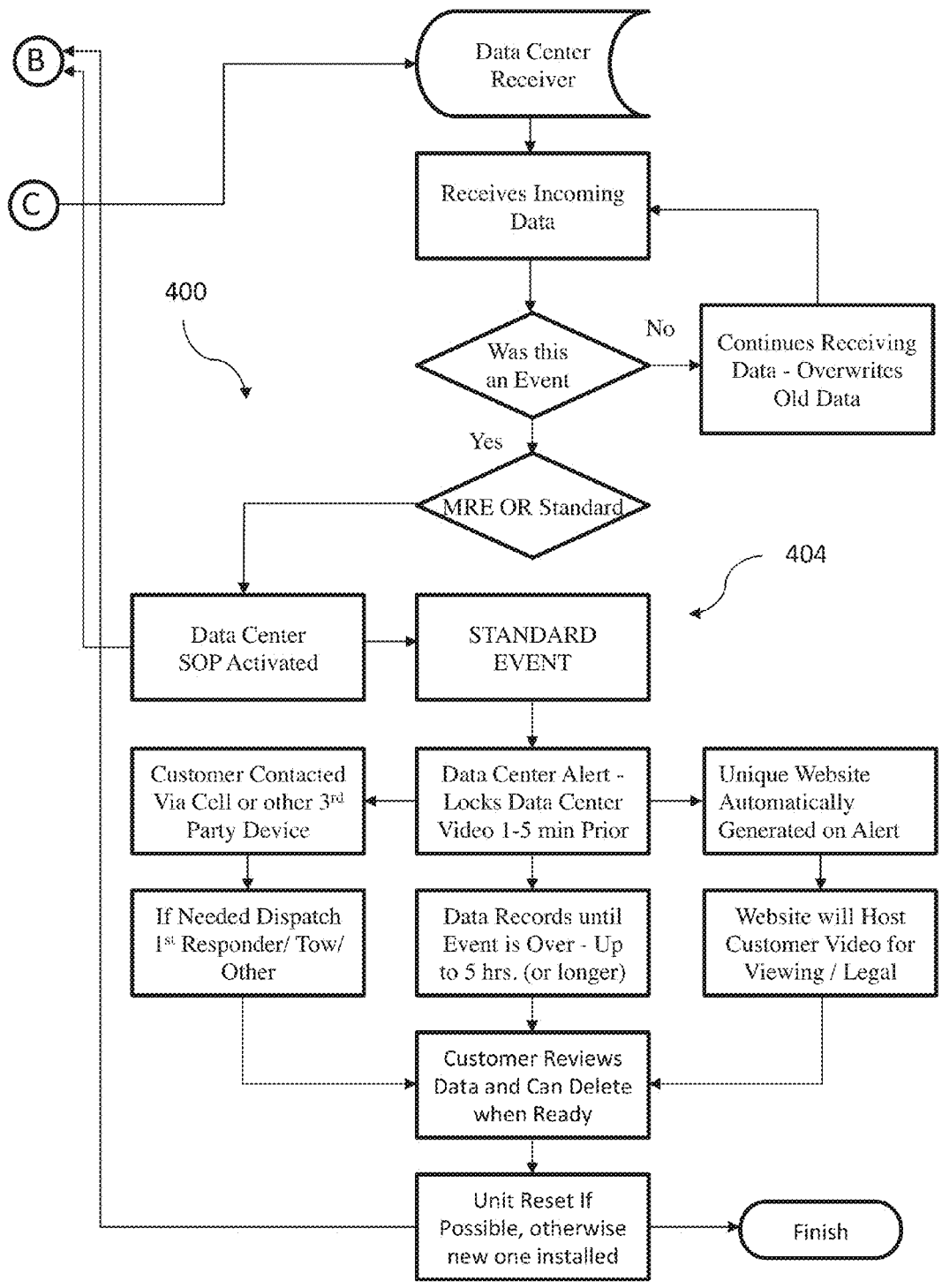

Referring now to FIGS. 19A-19C, an exemplary process 400 of the present invention is illustrated. Specifically, the process 400 may be divided into three general modules: main module 402 handling the active duties of the monitoring, recording and identifying, as disclosed above and shown in FIG. 19B; data center storage module for standard events 404, handling the duties of receiving and storing information relating to a standard event as shown in FIG. 19C; and data center storage module 406 for major recording events, handling the duties of receiving and storing information relating to major recording events, such as acts of criminals/terrorism, or natural disasters and the like as shown in FIG. 19A.

The main module 402 may be utilized for managing the user of the cameras and sensors to record data and information on an onboard hard drive, and for analyzing traffic signage, traffic indicators and the like. Data may be continuously recorded and may record over previous data until an event occurs. If an event occurs, the module determines whether the event is a standard event (such as an accident) or a major recording event (such as acts of terrorism/criminals or a natural disaster) and wirelessly uploads data to a data center. When wireless communications are unavailable, the data may be stored until wireless communications are available. Whether a standard or a major recording event, data is locked relating to a particular time period prior to the event, and during and immediate after the event. In a standard event, the locked data is merely uploaded to a data center for storage and further processing, such as contacting other parties informing them of the accident, and for storage of the data for analyzing the same, as illustrated in more detail in FIG. 19C.

The process 400 may further include an enhanced system 408. The enhanced system 408 may record video from a plurality of sources and store the video regardless of whether an event has occurred or not. This video may remain stored until the vehicle is turned off and the enhanced system recorder removed. By storing this video, a user may have access to the recorded video and may view what occurred or did not occur in real time.

If the event is a standard event, the data center storage module for standard events 404 may handle receiving and storing information relating to the standard event, as illustrated in FIG. 19C. The standard event may alert the Data Center, which may in turn lock video prior to the event. The length of video that is locked prior to the event may be long enough so that the standard event can be seen and analyzed. For example, the length of locked video may be 1 minute prior to the event or may extend further such as 5 minutes prior to the event. Data may be continuously recorded after a standard event. Subsequent to a standard event, the customer may be contacted and accident responders may be dispatched. Further, the data may be uploaded to an online server for viewing and analyzing purposes. The data may be deleted and cleared at the customer's convenience.

Moreover, the information stored within the vehicle based on the plurality of video cameras, sensors and other information gathering equipment, may be accessible to a user directly from the vehicle or otherwise may be downloaded from the information storage system contained in the vehicle. For example, a specific user, such as a driver of the vehicle, an owner of the vehicle, a parent, or other individual may have access to the information contained on the system contained in the vehicle for receiving and viewing the same. The information may be accessible via wired or wireless means, and the user desiring access to the information contained thereon may need special software and/or access, that may be obtained via a subscription service or some other fee based structure.

If the event is a major recording event, functionality 406 is provided based on how to handle the data based on the major recording event, and how the data may be stored, as illustrated in FIG. 19A. The major recording event may include criminal, terrorist, and natural events. Of course, other major events known to one skilled in the art. For major recording events, the Data Center may utilize vehicles in the area being affected to get real time video streams of the major recording event. These recordings may be locked and analyzed, sent to law enforcement, or merely stored on servers for later use. The Data Center may lock past video recordings if an event occurred before the Data Center had notice of the major recording event.

It should be noted that various changes and modifications to the presently preferred embodiments described herein will be apparent to those skilled in the art. Such changes and modifications may be made without departing from the spirit and scope of the present invention and without diminishing its attendant advantages.

I claim:

1. A system for recording events relating to the operation of a vehicle, the system comprising:
    a plurality of video cameras recording visual information completely around a vehicle, wherein each of the plurality of video cameras comprises a visual field wherein a portion on the right side of each visual field overlaps with a portion on the left side of an immediately adjacent visual field to the right of each visual field, and a portion on the left side of each visual field overlaps with a portion on the right side of an immediately adjacent visual field to the left of each visual field, without any areas between adjacent visual fields external to the vehicle that are not covered by at least one of the plurality of video cameras;
    at least one sensor associated with the vehicle, the at least one sensor for sensing a condition occurring to the vehicle;
    a first hard drive for storing video information recorded by the plurality of video cameras and condition information relating to the condition sensed by the at least one sensor, the hard drive continuously recording the video information and the condition information when activated for a first period of time prior to an event, a second period of time during the event and a third period of time after the event, said hard drive recording over previously recorded information recorded by the video camera and the condition information sensed by the at least one sensor when the hard drive is full;
    a first processor for detection of the event, the first hard drive storing the video information thereby forming stored video information, wherein the stored video information comprises each of the visual fields, and including the overlapping visual field including all of the video information without deletion of any of the video information in each of the visual fields and in the overlapping visual fields wherein the stored video information is used to form a composited recorded scene comprising all of the visual fields including the overlapping visual fields and all of the video information without deletion of any of the video information in each of the visual fields and in the overlapping visual fields, and the condition information of a subset period of time shorter than the first period of time prior to the event, said subset period of time predefined by a user of the system and immediately preceding the occurrence of the event and lasting until the event, the hard drive further storing the video information and the condition information of the second period of time during the event, and of the third period of time after the event; and
    a data center external to the vehicle, the data center comprising a second hard drive, and means for uploading the stored video information for storage by the second hard drive,
    wherein the data center external to the vehicle receives the stored video information, the data center configured for viewing the composited recorded scene, wherein the composited recorded scene is presented to a viewer as a presentation selected from the group consisting of an enhanced 2D presentation and a stereoscopic presentation.

2. The system of claim 1 wherein the subset period of time is between about ten minutes and about 600 minutes in length.

3. The system of claim 1 wherein the subset period of time is between about 1 minute and about 10 minutes in length.

4. The system of claim 1 wherein the third time period is about 1 minute and about 30 minutes in length.

5. The system of claim 1 wherein the plurality of cameras together record video information from more than 360 degrees around a vehicle, including the overlapping visual fields.

6. The system of claim 1 wherein the plurality of cameras are placed in a location selected from the group consisting of externally mounted on the vehicle and internally mounted within the vehicle.

7. The system of claim 1 wherein the event relates to an accident of the vehicle.

8. The system of claim 1 wherein the processor identifies objects recorded by the plurality of cameras.

9. The system of claim 8 wherein the objects identified by the processor are selected from the group consisting of signage, vehicles, road markings, and combinations of the same.

10. The system of claim 1 further comprising:
    an electronic device in communication with the first processor, wherein the video information and the condition information of the subset period of time, the second period of time and the third period of time is uploadable to the electronic device.

11. The system of claim 10 wherein the electronic device is in communication with the first processor via a wired or wireless connection.

12. A method of recording events relating to the operation of a vehicle, the method comprising the steps of:
    providing a plurality of video cameras recording visual information completely around a vehicle, wherein each of the plurality of video cameras comprises a visual field wherein a portion on the right side of each visual field overlaps with a portion on the left side of an immediately adjacent visual field to the right of each visual field, and a portion on the left side of each visual field overlaps with a portion on the right side of an immediately adjacent visual field to the left of each visual field, without any areas between adjacent visual fields external to the vehicle that are not covered by at least one of the plurality of video cameras;
    providing at least one sensor associated with the vehicle, the at least one sensor for sensing a condition occurring to the vehicle;
    providing a first hard drive;
    continuously recording the video information of the plurality of video cameras for a first period of time prior to an event, a second period of time during an event and a third period of time after an event, said hard drive recording over previously recorded information recorded by the video camera and the condition information sensed by the at least one sensor when the hard drive is full;
providing a first processor;
detecting the event with the first processor;
storing the video information and the condition information of a subset period of time shorter than the first period of time prior to the event, said subset period of time predefined by a user of the system and immediately preceding the occurrence of the event and lasting until the event;
storing the video information and the condition information of the second time period during the event, and of the third period of time after the event, wherein the video information of the subset period of time, the second period of time and the third period of time form stored video information of the plurality of video cameras, wherein the stored video information of the plurality of video cameras includes all of each of the visual fields including the overlapping visual fields without deletion of any video information of the first and second cameras in the overlapping visual fields;
providing a data center external to the vehicle and comprising a second hard drive, and means for uploading the stored video information for storage by the second hard drive;
uploading the stored video information and storing the stored video information on the second hard drive;
forming a composited recorded scene with the stored video information comprising all of the visual fields including the overlapping visual fields and all of the video information without deletion of any of the video information in each of the visual fields and in the overlapping visual fields; and
viewing the recorded scene at the data center as a presentation selected from the group consisting of an enhanced 2D presentation and a stereoscopic presentation.

13. The method of claim 12 wherein the subset period of time is between about ten minutes and about 600 minutes in length.

14. The method of claim 12 wherein the subset period of time is between about 1 minute and about 10 minutes in length.

15. The method of claim 12 wherein the third time period is about 1 minute and about 30 minutes in length.

16. The method of claim 12 wherein the plurality of video cameras together record greater than 360 degrees around the vehicle, including the overlapping visual fields.

17. The method of claim 12 wherein the plurality of video cameras are placed in a location selected from the group consisting of externally mounted on the vehicle and internally mounted within the vehicle.

18. The method of claim 12 wherein the event relates to an accident of the vehicle.

19. The method of claim 12 further comprising:
analyzing video information recorded on the first hard drive by the first processor; and
identifying objects recorded by the plurality of video cameras.

20. The method of claim 19 wherein the objects identified by the processor are selected from the group consisting of signage, vehicles, road markings, and combinations of the same.

21. The method of claim 12 further comprising the steps of:
providing an electronic device;
connecting the electronic device to the first processor; and
uploading the video information and condition information of the period of time, the second period of time and the third period of time to the electronic device from the processor.

22. The method of claim 21 wherein the electronic device is connected to the first processor via a wired or wireless connection.

23. A system for recording events relating to the operation of a vehicle, the system comprising:
a plurality of video cameras recording visual information completely around a vehicle, wherein each of the plurality of video cameras comprises a visual field wherein a portion on the right side of each visual field overlaps with a portion on the left side of an immediately adjacent visual field to the right of each visual field, and a portion on the left side of each visual field overlaps with a portion on the right side of an immediately adjacent visual field to the left of each visual field, without any areas between adjacent visual fields external to the vehicle that are not covered by at least one of the plurality of video cameras;
a hard drive configured to store the visual information of each of the visual fields forming stored video information, wherein the stored video information includes each of the visual fields including the overlapping visual fields without deletion of any of the video information in in the overlapping visual fields wherein the stored video information is used to form a composited recorded scene comprising all of the visual fields including the overlapping visual fields and all of the video information without deletion of any of the video information in each of the visual fields and in the overlapping visual fields; and
a data center external to the vehicle comprising a processor external to the vehicle and a visual display, the processor configured to receive the stored video information and for viewing the composited recorded scene as a presentation selected from the group consisting of an enhanced 2D presentation and a stereoscopic presentation.

* * * * *